(12) United States Patent
Lee et al.

(10) Patent No.: US 11,613,099 B2
(45) Date of Patent: Mar. 28, 2023

(54) GLASS STACK STRUCTURE FOR FORMING A FLEXBILE GLASS AND METHOD OF MANUFACTURING THE SAME

(71) Applicant: Samsung Display Co., Ltd., Yongin-Si (KR)

(72) Inventors: Seungjun Lee, Cheonan-si (KR); Sung-Shin Kwak, Cheongju-si (KR); Sunkwan Kim, Cheonan-si (KR); Daeho Yang, Asan-si (KR); Jun Hwan Choi, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 49 days.

(21) Appl. No.: 17/387,183

(22) Filed: Jul. 28, 2021

(65) Prior Publication Data

US 2022/0134707 A1  May 5, 2022

(30) Foreign Application Priority Data

Nov. 2, 2020 (KR) .................. KR10-2020-0144505

(51) Int. Cl.
*B32B 7/14* (2006.01)
*B32B 3/18* (2006.01)
*B32B 37/12* (2006.01)
*B32B 17/06* (2006.01)
*B32B 37/00* (2006.01)

(52) U.S. Cl.
CPC .................. *B32B 7/14* (2013.01); *B32B 3/18* (2013.01); *B32B 17/06* (2013.01); *B32B 37/003* (2013.01); *B32B 37/1292* (2013.01); *B32B 2307/732* (2013.01); *B32B 2315/08* (2013.01); *B32B 2457/20* (2013.01)

(58) Field of Classification Search
CPC .............. B32B 7/14; B32B 3/18; B32B 17/06
See application file for complete search history.

(56) References Cited

U.S. PATENT DOCUMENTS 9,494,178 B2 * 11/2016 Liu ........................... C09J 5/00

FOREIGN PATENT DOCUMENTS

| KR | 101117399 B1 | 3/2012 |
|---|---|---|
| KR | 101923736 B1 | 11/2018 |

\* cited by examiner

*Primary Examiner* — Elizabeth E Mulvaney
(74) *Attorney, Agent, or Firm* — Cantor Colburn LLP

(57) ABSTRACT

A glass stack structure includes: a carrier plate having a width in a first direction and a length in a second direction; a stack glass on the carrier plate and including mother glasses sequentially stacked therein; adhesive lines including a high viscous material and arranged at peripheral portions of the carrier plate and the mother glasses to adhere the carrier plate to the mother glasses, and the adhesive lines includes wave lines extending in the second direction and spaced apart from each other in the first direction and linear lines extending in the first direction and spaced apart from each other in the second direction; and an adhesive layer including a low viscous material and covering a cell area of the carrier plate and the mother glasses to adhere the carrier plate to the mother glasses, where the cell area is defined by the wave lines and the linear lines.

20 Claims, 16 Drawing Sheets

GLASS STACK STRUCTURE FOR FORMING A FLEXBILE GLASS AND METHOD OF MANUFACTURING THE SAME

This application claims priority to Korean Patent Application No. 10-2020-0144505, filed on Nov. 2, 2020, and all the benefits accruing therefrom under 35 U.S.C § 119, the content of which in its entirety is herein incorporated by reference.

BACKGROUND

1. Field

Embodiments of the invention relate to a glass structure for forming a flexible glass and a method of manufacturing the glass structure, and more particularly, to a glass structure for a flexible glass of a display device and a method of manufacturing the glass structure.

2. Description of the Related Art

In general, a display panel for a display device is usually covered by a cover window for protecting the display panel from external scratches and impacts. Recently, the demand for a flexible cover window for a flexible display devices, such as a rollable display device and a foldable display device, has increased.

Recently, a flexible glass window such as a ultra-thin glass ("UTG") has been increasingly adopted to a relatively small-sized display device as the flexible cover window. Particularly, the thickness of the UTG tends to substantially decrease without any deterioration of durability, so that the minimal radius of curvature of the UTG may be substantially reduced. For those reasons, the flexible glass window tends to replace a flexible plastic window such as a colorless polyimide ("CPI") window for improving the transparency and signal sensitivity of the display device.

However, special handling techniques may be used in the manufacturing process of the flexible glass window due to the thin thickness. The thin thickness of the glass may cause the deterioration of durability and various handling loads may be burdened on the various unit steps of the manufacturing process due to the weak durability.

SUMMARY

When a flexible glass window is manufactured using a ultra-thin glass ("UTG"), for example, a mother glass for forming the UTG may be handled by a unit of glass stack structure in which a plurality of the mother glasses having a thin thickness corresponding to the UTG is stacked on a carrier plate in such a configuration that the glass stack structure may have a sufficient durability. Then, the glass stack structure may be separated into a plurality of UTG packs by a unit of panel size and each UTG pack includes a plurality of UTGs that are adhered to each other over and over. Thereafter, the UTG pack is unpacked into a plurality of individual UTGs by removing the adhesive from the UTG pack, thereby manufacturing a plurality of the UTGs.

If the mother glass and the carrier plate and the neighboring mother glasses are adhered to each other without a sufficient removal of the bubbles therebetween, the mother glass may be defectively adhered to the carrier plate or the lower neighboring mother glass and the glass stack structure may be partially defective at every point where the bubbles remain. Thus, a number of a defective UTG pack increases in separating the glass stack structure.

If the bubbles are not sufficiently removed from the boundary of the neighboring mother glasses and the boundary of the mother glass and the base plate, the adherence force between the mother glasses and the carrier plate is deteriorated and the mother glasses may be separated in the glass stack structure. Thus, each UTG may be separated from each other and the flatness is deteriorated in the defective UTG pack, which increases the breaks of the UTG in the manufacturing process.

Thus, it is desired to sufficiently remove the bubbles from the neighboring mother glasses and from the mother glass and the base plate to improve glass stack structure.

Embodiments of the invention provide a glass stack structure having a high viscous wave line substantially perpendicular to a bubble discharge flow to thereby effectively prevent a reverse flow of the bubble and enlarge an effective cell area.

Embodiments of the invention provide a method of manufacturing a glass stack structure.

According to an embodiment of the invention, a glass stack structure includes: a carrier plate having a carrier width in a first direction, a carrier length in a second direction perpendicular to the first direction, and a first thickness in a third direction perpendicular to the first direction and the second direction; a stack glass on the carrier plate and including a plurality of mother glasses sequentially stacked on the carrier plate, where each of the mother glasses may have a second thickness less than the first thickness; a plurality of adhesive lines including a high viscous material and arranged at peripheral portions of the carrier plate and the mother glasses, where the carrier plate and the mother glasses are adhered to each other at the peripheral portions by the adhesive lines, and the adhesive lines includes a pair of wave lines extending in the second direction and spaced apart from each other in the first direction and a pair of linear lines extending in the first direction and spaced apart from each other in the second direction; and an adhesive layer including a low viscous material and covering a cell area of the carrier plate and the mother glasses, wherein the carrier plate and the mother glasses may be adhered to each other at the cell area by the adhesive layer, and the cell area is defined by the pair of the wave lines and the pair of the linear lines.

According to another embodiments of the invention, a method of manufacturing a glass stack structure includes loading a carrier plate onto a support, wherein the carrier plate has a length longer than a width thereof; providing a pair of high viscous linear dams on the carrier plate along a latitudinal direction to be spaced apart from each other in a longitudinal direction, wherein a preliminary cell area is defined on the carrier plate by the pair of the high viscous linear dams, and second marginal areas are defined on the carrier plate between edge portions of the carrier plate and the pair of the high viscous linear dams; providing a pair of high viscous dot-line dams on the carrier plate along the longitudinal direction to be spaced apart from each other in the latitudinal direction, wherein the pair of the high viscous dot-line dams includes a plurality of dot dams and a plurality of flow spaces defined between neighboring dot dams, the preliminary cell area defined by the pair of the high viscous dot-line dams is provided as a cell area, and peripheral areas between edge portions of the carrier plate and the pair of the high viscous dot-line dams are provided as first marginal areas; supplying a low viscous adhesive onto the cell area of the carrier plate in a way such that the cell area is irregularly covered by the low viscous adhesive; positioning a mother glass on the pair of the high viscous dot-line dams and the pair of the high viscous linear dams; and conducting a laminating process for the mother glass in a way such that the mother glass is compressed to the carrier plate sequentially from a left side to a right side in the latitudinal direction until the low viscous adhesive uniformly spreads in the cell area to adhere the mother glass to the carrier plate, wherein bubbles are removed in the low viscous adhesive through the flow spaces.

According to embodiments of the invention, the mother glass may be adhered to the carrier plate by the high viscous adhesive line at the peripheral areas of the glass stack structure and by the low viscous adhesive layer at the cell areas (central areas) of the glass stack structure in the laminating process. The cell area, on which the low viscous adhesive is arranged, may be defined by the dot-line dams extending in the second direction and the dot-line dams may be formed into the wave lines of the adhesive line by the compression force in the laminating process. The dot-line dams may include a plurality of dot dams and a plurality of flow spaces.

In such embodiments, the low viscous adhesive may be sufficiently prevented from being leaked or overflowed out of the carrier plate by the dot dams and the bubbles in the low viscous adhesive may be sufficiently discharged through the flow space in the lamination process for combining the mother glass to the carrier plate. Thus, the suck back defect may be effectively prevented around the dot-line dams, and the effective cell area of the glass stack structure may be maximized.

BRIEF DESCRIPTION OF THE DRAWINGS

These and other features of the invention will become more apparent by describing in detail embodiments thereof with reference to the accompanying drawings, in which.

DETAILED DESCRIPTION

Figure 1:
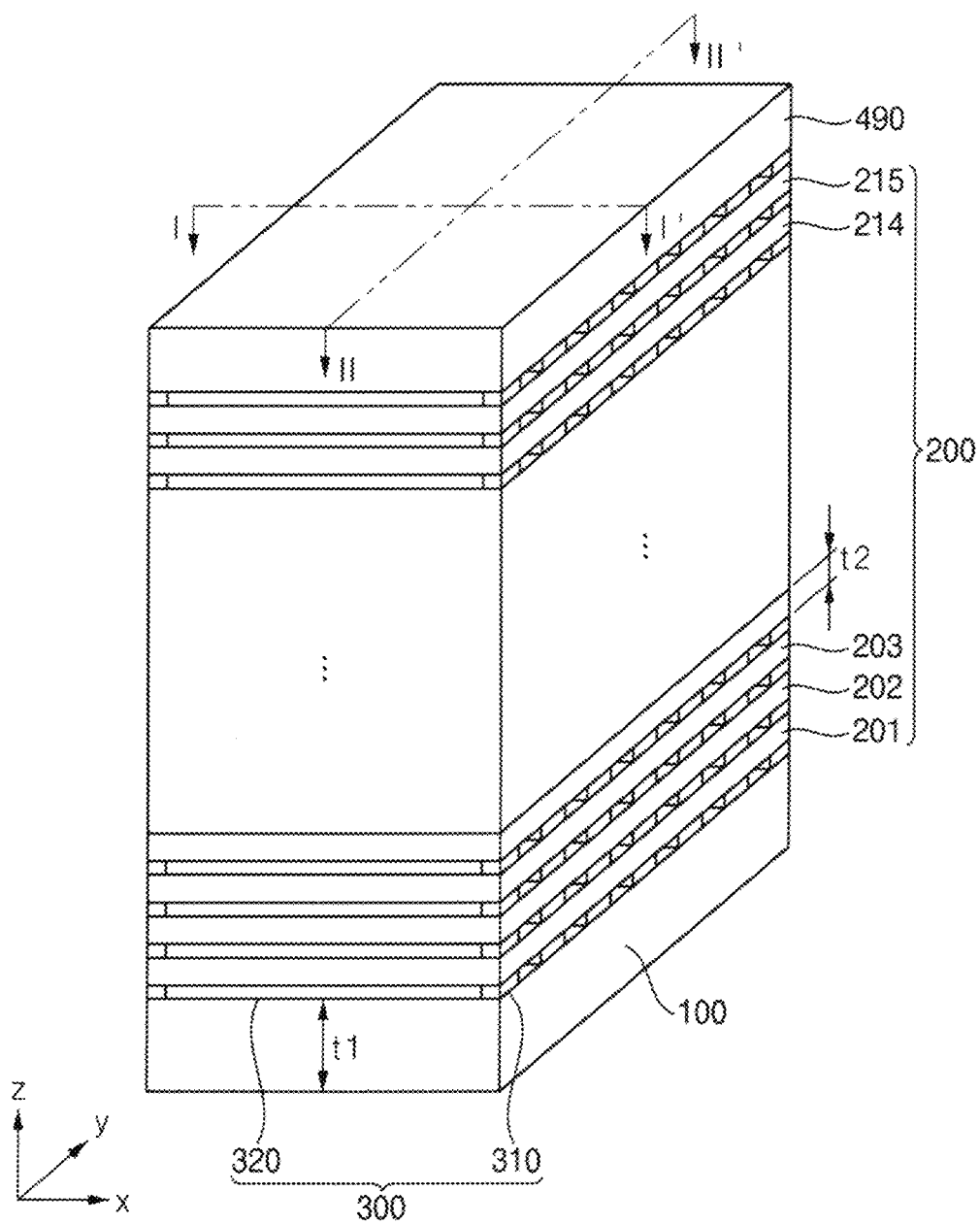
FIG. 1 is a perspective view illustrating a glass stack structure in accordance with an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
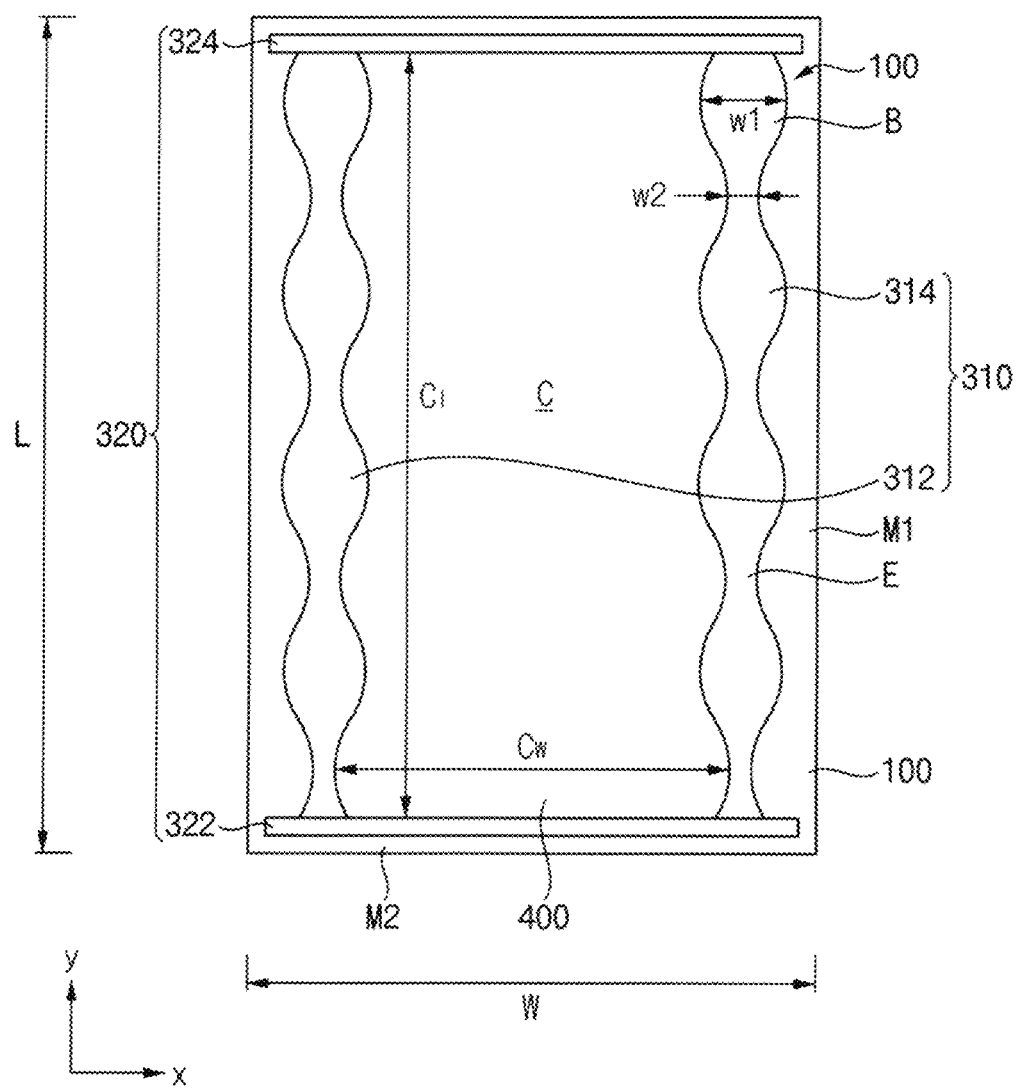
FIG. 2 is a plan view illustrating an adhesive line and an adhesive layer on the carrier plate of the glass stack structure shown in FIG. 1.
Figure 3A:
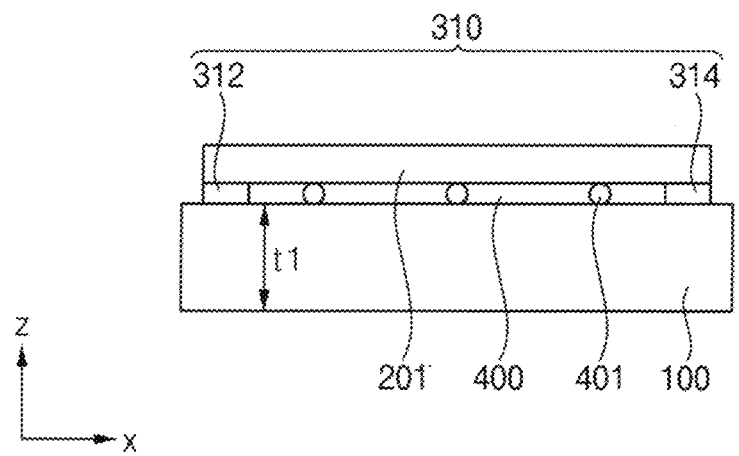
FIG. 3A is a cross-sectional view of the glass stack structure taken along line I-I' shown in FIG. 1.
Figure 3B:
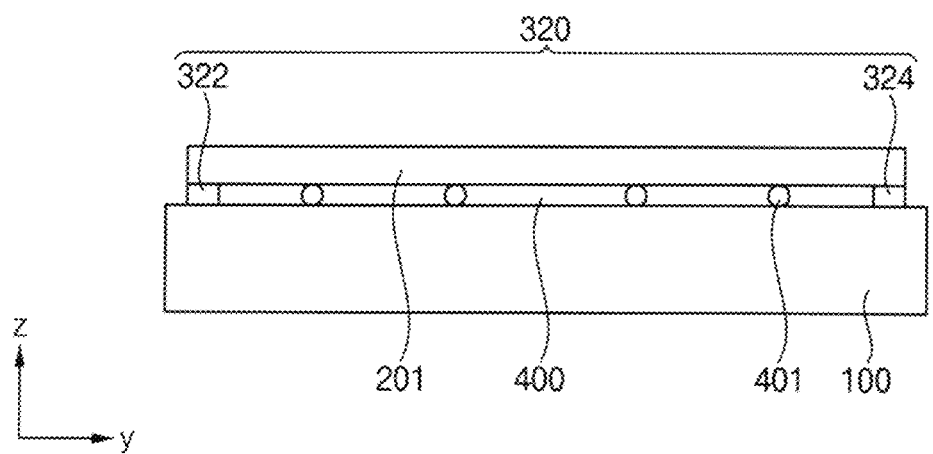
FIG. 3B is a cross-sectional view of the glass stack structure taken along line II-IF shown in FIG. 1.

FIG. 1 is a perspective view illustrating a glass stack structure in accordance with an example embodiment of the invention, and FIG. 2 is a plan view illustrating an adhesive line and an adhesive layer on the carrier plate of the glass stack structure shown in FIG. 1. FIG. 3A is a cross-sectional view of the glass stack structure taken along line I-I' shown in FIG. 1 and FIG. 3B is a cross-sectional view of the glass stack structure taken along line II-IF shown in FIG. 1. In FIGS. 3A and 3B, only the carrier plate and a first mother glass of a plurality of mother glasses in the glass stack structure are illustrated for convenience of illustration and description.

Referring to FIGS. 1 to 3B, a glass stack structure 500 in accordance with an embodiment of the invention may include a carrier plate 100, a stack glass 200 positioned on the carrier plate 100 in such a configuration that a plurality of mother glasses 201 to 215 may be sequentially stacked on the carrier plate 100, a high viscous adhesive line 300 extending on a peripheral portion of the carrier plate 100 and the mother glasses 201 to 215 for adhering the carrier plate 100 and the mother glasses 201 to 215 to each other along the adhesive line 300, a low viscous adhesive layer 400 coated on cell areas C of the carrier plate 100 and the mother glasses 201 to 215 defined by the adhesive line 300 for adhering the carrier plate 100 and the mother glasses 201 to 215 to each other on the whole cell areas C thereof, and a protection plate 490 covering an uppermost mother glass 215 to protect the uppermost mother glass 215 from surroundings.

In one embodiment, for example, the glass stack structure 500 may include a plurality of ultra-thin glasses ("UTG") or any other flexible glasses that may be provided for the cover window of the display device. However, the glass stack structure may also include various stack structures as long as a plurality of glasses may be adhered to each other and may be stacked on the carrier plate in a single structure.

In one embodiment, for example, the carrier plate 100 may include a base plate for supporting the stack glass 200. In an embodiment, the carrier plate 100 may be shaped into a rectangle having a carrier width W in a first direction x and a carrier length L in a second direction y substantially perpendicular to the first direction x. Herein, a third direction z perpendicular to the first and second direction x and y may be a thickness direction of the carrier plate 100. Thus, the characteristics of the carrier plate 100 may be variously modified based on the characteristics of the stack glass 200 and the number of the mother glasses in the stack glass 200.

In an embodiment, the carrier length L of the carrier plate 100 may be sufficiently longer than the carrier width W in such a configuration that the bubbles in the cell area C may be sufficiently discharged outwards through the high viscous adhesive line 300 when conducting a lamination process to each of the mother glasses 201 to 215 of the stack glass 200 in the first direction x. Thus, the carrier plate 100 may have sufficient discharge areas of the bubbles in the lamination process.

The carrier plate 100 may have a thickness sufficient for supporting the stack glass 200 having the plurality of the mother glasses 201 to 215, so that the thickness of the carrier plate 100 may be greater than that of each mother glass 201 to 215.

The mother glass may be provided as a temporary component for manufacturing the display device and thus may be supplied to a manufacturing line from a formation site. That is, when being formed in the formation site, the mother glass may be desired to be transferred to the manufacturing line of the display device from the formation site.

Thus, the mother glass may tend to be broken due to the ultimately small thickness and be likely to be contaminated from surrounding contaminants such as particles in the transfer from the formation site to the manufacturing line.

Accordingly, a plurality of the mother glasses may be grouped into a transfer bundle, referred to as the stack glass 200, and the transfer bundle of the mother glasses may be combined to the carrier plate 100 in a single structure. Thus, the mother glasses may be transferred by a unit of the stack glass 200. The carrier plate 100 may be combined to a bottom of the stack glass 200 and may be loaded into transfer vehicle such as a transfer cassette and a magazine. The transfer vehicle may make contact not with the stack glass 200 but with the carrier plate 100, and thus the mother glass may be effectively prevented from being fragile and contaminated.

In an embodiment, the carrier plate 100 may have a first thickness t1 sufficiently greater than a second thickness t2 of the mother glass 201 to 215 and may have a shape corresponding to an inner space of the transfer vehicle. In such an embodiment, the carrier plate 100 may have a size greater than or equal to that of the lowermost mother glass 201. In an embodiment, the first thickness t1 may have about 50 times to about 100 times the second thickness t2.

In one embodiment, for example, the second thickness t2 may be in a range of about 20 micrometers (μm) to about 300 μm and the stack glass 200 may include 15 to 20 mother glasses. Thus, in such an embodiment, the first thickness t1 of the carrier plate 100 may be in a range of about 0.1 millimeter (mm) to about 1.0 mm.

In an embodiment, the carrier plate 100 may have substantially the same coefficient of linear expansion as the mother glasses 201 to 215. Thus, the carrier plate 100 and the stack glass may expand by a same amount in the subsequent heat treatment process, so that no thermal stress may occur between the carrier plate 100 and the mother glasses 201 to 215 in the subsequent heat treatment process.

Thus, in such an embodiment, the first thickness t1 of the carrier plate 100 may be determined based on the coefficient of linear expansion of the mother glass as well as the number and weight of the mother glass.

In an embodiment, the stack glass 200 may include first to fifth mother glasses 201 to 215 that may be sequentially stacked on the carrier plate 100.

In one embodiment, for example, the first to fifth mother glasses 201 to 215 may include a flexible glass having the second thickness t2 much smaller than the second thickness t2. In one embodiment, for example, the flexible glass may include a UTG having a thickness of about 100 μm to about 250 μm and a curvature radius of about 2 mm to about 3 mm, and a glass film having a thickness of about 20 μm to about 80 μm and a curvature radius less than or equal to about 1 mm.

A raw glass may be processed into the flexible glass in a way such that the flexible glass may have a predetermined thickness and a predetermined curvature radius and then the flexible glass may be stored in a glass transfer deck. A plurality of the flexible glasses may be stacked on the carrier plate 100 and adhered to each other as the mother glasses 201 to 215.

Any other glasses as well as the flexible glasses may also be stacked on the carrier plate 100 as long as the glasses may be adhered to each other by an adhesive without any substantial bubbles between the neighboring glasses.

A plurality of the mother glasses 201 to 215 may be stacked into the stack glass 200 on the carrier plate 100. However, the stack glass 200 may include more or less 15 mother glasses based on the manufacturing process and the manufacturing apparatus of the display device.

The high viscous adhesive line 300 and the low viscous adhesive layer 400 may be interposed between the carrier plate 100 and the first mother glass 201 and between the neighboring glasses of the first to fifth mother glasses 201 to 215. Thus, the carrier plate 100 and each of the first to fifth mother glasses 201 to 215 may be adhered to each other in the glass stack structure 500.

The carrier plate 100 and the first to fifth mother glasses 201 to 215 may be sufficiently or effectively adhered to each other by the adhesive line 300 and the adhesive layer 400 until the first to fifth mother glasses 201 to 215 are separated into individual mother glasses from the stack glass 210.

The adhesive line 300 may include a high viscous adhesive material and may be arranged at peripheral portions of the carrier plate 100 and the mother glasses 201 to 215, so that the cell area C may be defined by the adhesive lines 300. The adhesive layer 400 may include a low viscous adhesive material and may be arranged on the cell areas C of the carrier plate 100 and the mother glasses 201 to 215. The adhesive layer 400 may be formed in the cell area C by the lamination process and the adhesive line 300 may prevent the low viscous adhesive material from being leaked from the carrier plate 100 and the stack glass 200 in the lamination process due to the high viscosity. In such an embodiment, the adhesive layer 400 may be uniformly spread in the cell area C as thin as possible due to the low viscosity.

Hereinafter, for convenience of description, the adhesive line 300 and the adhesive layer 400 between the carrier plate 100 and the first mother glass 201 (often referred to as the lowermost mother glass) of the glass stack structure 500 will be described in detail. In such an embodiment, the neighboring glasses of the mother glasses 201 to 215 may also be adhered to each other by a same adhesive line 300 and the adhesive layer 400.

The adhesive lines 300 may be adhered to the peripheral portions of the carrier plate 100 and the first mother glass 201, so that the peripheral portions of the carrier plate 100 and the first mother glass 201 may be adhered to each other by the high viscous adhesive line 300. The adhesive lines 300 may function as a dam for preventing the leakage of the low viscous adhesive material in the lamination process for forming the adhesive layer 400. In the lamination process, the low viscous adhesive material may be uniformly spread in the whole cell area C defined by the adhesive lines 300 on the carrier plate 100 and the low viscous adhesive material may be effectively prevented from flowing over the adhesive lines 300 in the lamination process, while the bubbles in the low viscous adhesive material may flow out through the adhesive lines 300. Thus, a stack apparatus for stacking the first mother glass 201 onto the carrier plate 100 may be effectively prevented from contaminated form the overflowing low viscous adhesive material.

Thus, in such an embodiment, the adhesive line 300 may have a predetermined configuration and material such that the leakage of the low viscous adhesive material is sufficiently or effectively prevented and the bubble discharge may be sufficiently conducted. In an embodiment, the adhesive line 300 may be compressed in the lamination process for forming the adhesive layer 400, so that the shape of the adhesive line 300 may be variously deformed according to pressure distributions in the lamination process.

In one embodiment, for example, the adhesive line 300 may include a pair of wave lines 310 extending in the second direction y and spaced apart from each other in the first direction x and a pair of straight lines 320 extending in the first direction x and spaced apart from each other in the second direction y.

The first direction x is a latitudinal or width direction of the carrier plate 100 and the lamination process for forming the adhesive layer 400 is conducted in the first direction x. The second direction y is a longitudinal or length direction of the carrier plate 100.

The low viscous adhesive material may be spread in the whole cell area C toward the first direction x and the second direction y and the bubbles in the low viscous adhesive material may flow out in the first direction x in the lamination process. Thus, the adhesive lines 300 spaced apart from each other in the first direction x may minimize the overflow of the low viscous adhesive material and maximize the outflow of the bubbles in the low viscous adhesive material. Accordingly, the adhesive lines 300 spaced apart from each other in the first direction x may include thick portions (body portion B) by which the overflow of the low viscous adhesive material may be minimized and thin portions (extended portion E) at which the outflow of the bubbles may be maximized in the laminating process. The thick portions and the thin portions may be alternately disposed in the second direction y in a wave-like form, so that the adhesive lines 300 spaced apart from each other in the first direction x may be provided as a pair of the wave lines 310 extending in the second direction y. In such an embodiment, no bubbles may flow out from the cell area in the second direction y and thus the adhesive lines 300 spaced apart from each other in the second direction y may not have the thin portions for discharging the bubbles out of the cell area C. The adhesive lines 300 spaced apart from each other in the second direction y may be uniform along the first direction x and may be provided as a pair of the straight lines 320 extending in the first direction x.

Accordingly, in such an embodiment, the bubbles in the low viscous adhesive material may be sufficiently removed from the cell area C, such that the first mother glass 201 may be stably adhered to the carrier plate 100.

In such an embodiment, the pair of the wave lines 310 may include first and second length-defining lines 312 and 314 extending in the second direction y and spaced apart from each other in the first direction x. A cell length Ci of the cell area C may be determined based on the first and second length-defining lines 312 and 314. In such an embodiment, the pair of the straight lines 320 may include first and second width-defining lines 322 and 324 extending in the first direction x and spaced apart from each other in the second direction y. A cell width $C_w$ of the cell area C may be determined based on the first and second width-defining lines 322 and 324. An outside of the cell area C may be provided as a marginal area M that may be separated from the cell area C by the wave lines 310 and the straight lines 320. Thus, the cell area C and the marginal area M may be separated from each other by the high viscous adhesive line 300.

Thus, the cell area C and the marginal area M may be defined in the glass stack structure 500 by the high viscous adhesive line 300 that may be arranged at the peripheral portions of the carrier plate 100 and the mother glasses 201 to 215. The low viscous adhesive layer 400 may be arranged in the cell area C of the glass stack structure 500.

The carrier plate 100 and the first mother glass 201 may make surface contact or adherence in the cell area C via the adhesive layer 400 and may make line contact or adherence in the peripheral area P via the adhesive line 300.

The adhesive line 300 may have substantially a same height as the adhesive layer 400. In one embodiment, for example, the height of the adhesive line 300 including the wave line 310 and the straight line 320 may be in a range of about 30 μm to about 60 μm from the carrier plate 100 and may be varied based on an adhesive spacer 401 that will be described in detail hereinafter.

The adhesive line 300 may have such a high viscosity that the shape or configurations of the adhesive line 300 may be maintained in the lamination process for forming the adhesive layer 400.

In one embodiment, for example, the adhesive line 300 may be under a gel state having a viscosity of about 100,000 centipoise (cp) to about 1,000,000 cp, so that the adhesive line 300 may function as a dam for preventing the overflow of the low viscous adhesive material out of the carrier plate 100 in the laminating process. In one embodiment, for example, the adhesive line 300 may include epoxy-based materials such as bisphenol F-type epoxy resin.

In an embodiment, the wave line 310 may include a plurality of body portions B and extended portions E that may be alternately disposed in the second direction y. A pair of the neighboring body portions B may be connected to the extended portion E by a compression force in the lamination process.

A plurality of the body portions B having a first width w1 may be arranged in the second direction y by a same gap distance and a plurality of the extended portions E having a second width w2 smaller than the first width w1 may be arranged in a gap space between a pair of the neighboring body portions B. The neighboring body portions B may be extended into the gap space by the compression force, until the neighboring body portions B may be connected to each other in the gap space. The connected portion of the neighboring body portions B may be provided as the extended portion E. The body portion B may be formed from a dam for preventing the leakage of the low viscous adhesive material and the gap space between the neighboring dams may be provided or defined as a flow space of the bubble in the laminating process.

As the extended portion E may be defined by extracted portion of the body portion B by the compression force in the lamination process, the second width w2 of the extended portion E may be smaller than the first width w1 of the body portion B. The body portion B may be substantially unchanged except for the extractions in the gap space, so that the width loss of the body portion B may be minimized in the laminating process.

In an embodiment, a plurality of dot dams may be arranged on the carrier plate 100 by the same gap distance in the second direction y and the body portions B and the extended portions E of the wave line 310 may be arranged on the carrier plate 100 in the second direction y corresponding to the dot dams and the gap space between the dams.

The bubbles in the low viscous adhesive material may be sufficiently effectively discharged through the gap space between the dams. When the bubbles flow out of the cell area C to the marginal area M, some of the dams may be extracted to the gap space and the extend portion E of the wave line 310 may be formed and the bubbles may be effectively prevented from being flow reversely into the cell area C from the marginal area M. In such an embodiment, the reverse flow of the bubble may be sufficiently prevented by the extended portion E of the wave line 310. Therefore, the cell area C of the glass stack structure 500 may be sufficiently enlarged as large as possible.

In such an embodiment, the straight line 320 may be shaped into a continuous line that may be formed from a rod dam by the compression force in the laminating process. As the bubbles may not flow in the second direction y, the rod dam need not have the space through which the bubbles may flow out and thus the rod dam may be provided as a single body. Thus, the straight line 320 may be shaped into a single continuous line.

Accordingly, in an embodiment, a pair of the wave lines 310 may be arranged at left and right sides of the carrier plate 100 as the first and second width-defining lines 322 and 324 and a pair of the straight lines 320 may be arranged at upper and lower sides of the carrier plate 100. Thus, the area of the carrier plate 100 defined by the pair of the wave lines 310 and the pair of the straight lines 320 may be provided or defined as the cell area C and the rest of the carrier plate 100 outside of the pair of the wave lines 310 and the pair of the straight lines 320 may be provided or defined as the marginal area M. The cell area C of the carrier plate 100 may be covered with the low viscous adhesive layer 400.

Then, the first mother glass 201 may be adhered to the carrier plate 100 by the adhesive line 300 and the adhesive layer 400 in such a configuration that the first mother glass 201 may make surface adherence to the cell area C of the carrier plate 100 by the adhesive layer 400 and may make line adherence to the peripheral portion of the carrier plate 100 by the adhesive line 300.

The adhesive layer 400 may include low viscous adhesive material, so that the adhesive layer 400 may be uniformly coated or spread on the whole cell area of the carrier plate 100 in the subsequent laminating process. In one embodiment, for example, the low viscous adhesive material may be provided onto the cell area C in a sol state having a viscosity of about 1,000 cp to about 10,000 cp, and thus the low viscous adhesive material may sufficiently flow on the cell area C in the laminating process. In one embodiment, for example, the low viscous adhesive material may include urethane-based materials such as acrylate.

In an embodiment, the adhesive layer 400 may further include a plurality of spacers 401 interposed between the carrier plate 100 and the first mother glass 201. The spacer 401 may make the first mother glass 201 to be apart from the carrier plate 100 by a stack gap.

In one embodiment, for example, the spacer 401 may include an inorganic particle having a size of about 30 μm to about 60 μm and may be sufficiently resistive to the compression force in the laminating process. Thus, the shape of the spacer 401 may be substantially unchanged in the laminating process and the first mother glass 201 and the carrier plate 100 may be spaced apart by the stack gap corresponding to the size of the spacer 401.

The adhesive layer 400 may be arranged on a portion of the marginal area M of the carrier plate 100.

Figure 4:
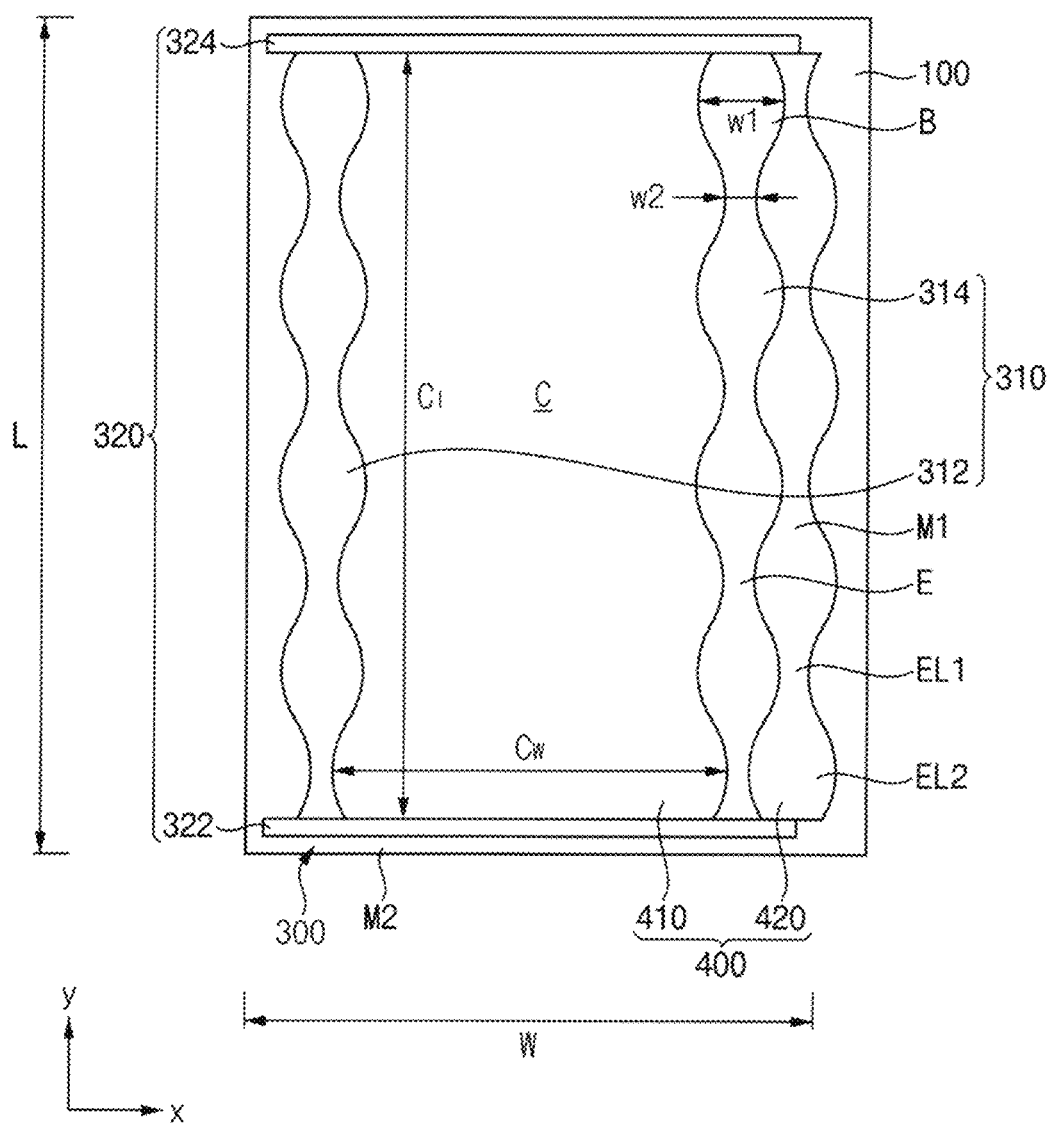
FIG. 4 is a plan view illustrating an alternative embodiment where the adhesive line and the adhesive layer on the carrier plate of the glass stack structure shown in FIG. 1 are modified.

FIG. 4 is a plan view illustrating an alternative embodiment where the adhesive line and the adhesive layer on the carrier plate of the glass stack structure shown in FIG. 1 are modified.

Referring to FIG. 4, in an embodiment, the low viscous materials in the cell area C may be partially overflowed to a portion of the marginal area M of the carrier plate 100 in the laminating process that may be conducted in the first direction x in a way such that the marginal area M around the adhesive line 300 may be partially covered with the low viscous materials. Thus, the adhesive layer 400 may include a cell adhesive 410 that may be arranged in the cell area C of the carrier plate 100 and an adhesive 420 that may be arranged on the marginal area M adjacent to the adhesive line 300.

The marginal area M may include a first marginal area M1 that may be separated from the cell area C by the wave line 310 and a second marginal area M2 that may be separated from the cell area C by the straight line 320. The edge adhesive 420 may be arranged on the first marginal area M1 of the carrier plate 100. As the bubble may not flow in the second direction y, no edge adhesive 420 may be arranged on the second marginal area M2 of the carrier plate 100.

Some of the low viscous adhesive material may be flow out of the cell area C through the gap space between the neighboring dot dams together with the bubbles to thereby form the edge adhesive 420 on the first marginal area M1 corresponding to the wave line 310. Thus, the edge adhesive 420 may include a plurality of concave portions EL1 corresponding to the body portions B of the wave line 310 and a plurality of convex portions EL2 corresponding to the extended portions E of the wave line 310. The concave portions EL1 and the convex portions EL2 may be alternately arranged on the first marginal area M1 of the carrier plate 100 in the second direction y. Thus, the edge adhesive 420 may be shaped into a curved line extending in the second direction y.

The edge adhesive 420 may be selectively provided on the marginal area M of the carrier plate 100 adjacent to the wave line 310. The process conditions of the laminating process may be controlled in a way such that the low viscous adhesive material may not be leaked from the carrier plate 100 when the low viscous adhesive material may flow out of the cell area C together with the bubbles.

In such an embodiment, the low viscous adhesive material may be controlled to flow out of the cell area C to a predetermined amount for the removal of the bubbles, so that the edge adhesive 420 may include the convex portions EL2 without the concave portions EL1.

Figure 5:
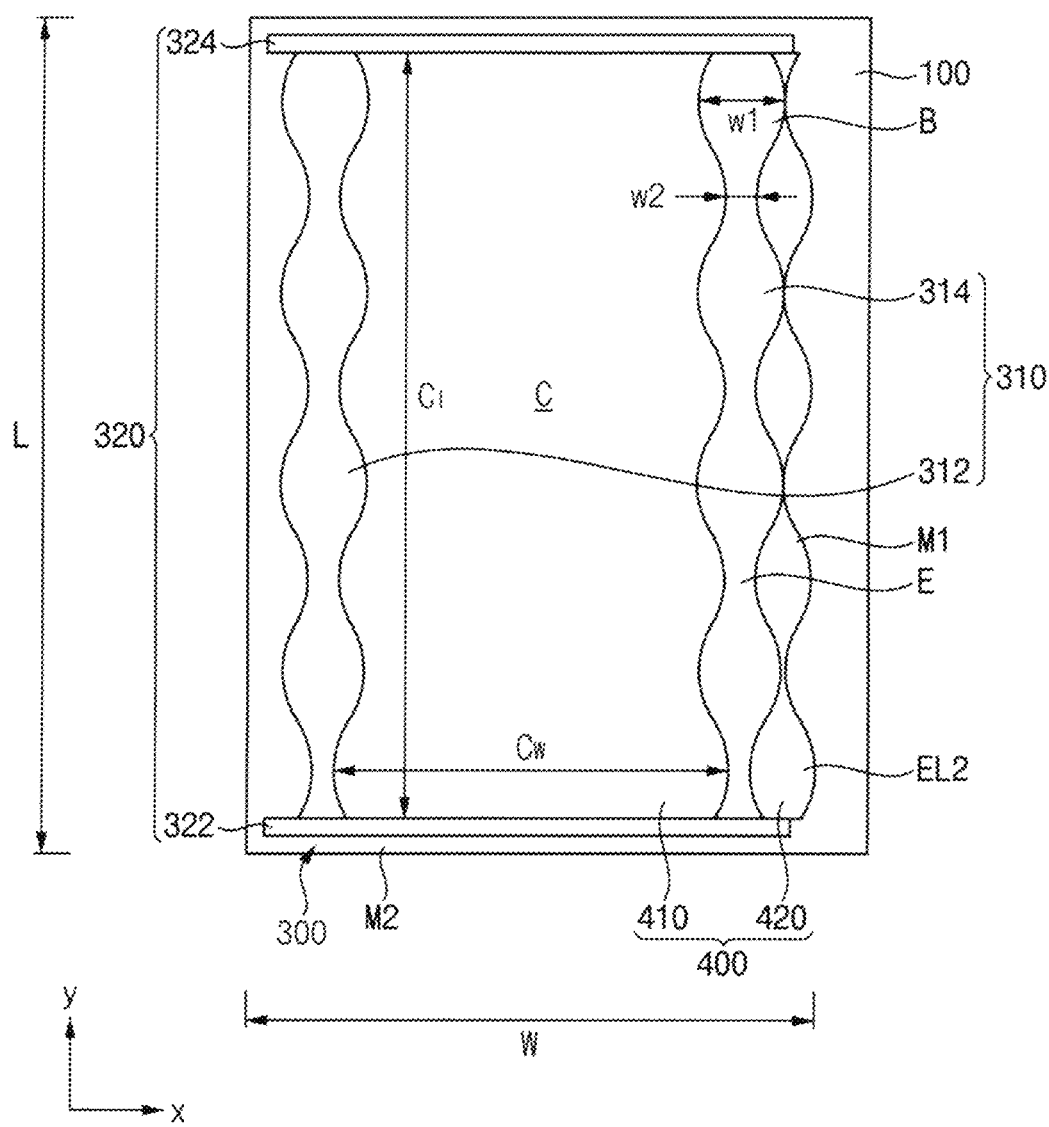
FIG. 5 is a plan view illustrating another alternative embodiment where the adhesive line and the adhesive layer on the carrier plate of the glass stack structure shown in FIG. 1 are modified.

FIG. 5 is a plan view illustrating another alternative embodiment where the adhesive line and the adhesive layer on the carrier plate of the glass stack structure shown in FIG. 1 are modified.

Referring to FIG. 5, in an embodiment, the edge adhesive 420 may be arranged on the first marginal area M1 adjacent to the extended portions E and may not be arranged on the marginal area M1 adjacent to the body portions B. Thus, no concave portions EL1 may be arranged on the first marginal area M1 and only the convex portions EL2 may be arranged on the first marginal area M1 of the carrier plate 100. In such an embodiment, the edge adhesive 420 may be bulged from the extended portion E of the wave line 310.

Thereafter, the high viscous adhesive line 300 may be arranged on the peripheral portion of the first mother glass 201 and the low viscous adhesive layer 400 may be arranged on the cell area C of the first mother glass 201, and then the second mother glass 202 may be adhered to the first mother glass 201 by the adhesive line 300 and the adhesive layer 400. Then, the third to fifth mother glasses 203 to 215 may be sequentially adhered over and over on the second mother glass 202, so that the first to fifth mother glasses 201 to 215 may be stacked and adhered to the carrier plate 100 as the stack glass 200.

After the formation of the stack glass 200, the protection plate 490 may be adhered to the fifth mother glass 215 by the adhesive line 300 and the adhesive layer 400 in a same way as that described above. Thus, the first mother glass 215, which is an uppermost mother glass, may be covered with the protection plate 490. The bottom of the stack glass 200 may be covered with the carrier plate 100 and the top of the stack glass 200 may be covered with the protection plate 490.

Accordingly, in such an embodiment, the stack glass 200 may be protected from external forces and particles and the bundle of the mother glasses 201 to 215 may be sufficiently from being damaged or broken by the external forces and particles when the stack glass 200 may be transferred to the manufacturing line of the display device.

According to embodiments of the glass stack structure 500, a plurality of the mother glasses 201 to 215 may be adhered to the carrier plate 100 by the low viscous adhesive layer 400 at the cell areas C (central areas) of the glass stack structure 500 and by the high viscous adhesive line 300 at the peripheral areas P of the glass stack structure 500. The bubbles may be sufficiently removed from the low viscous adhesive layer 400 in the lamination process to thereby improve the adherence between the mother glasses. In such embodiments, the discharged bubbles may be sufficiently prevented from flowing reversely into the cell area C from the marginal area M by the extended portions E of the high viscous wave line 310 to thereby sufficiently enlarge the effective cell area C of the glass stack structure 500.

Figure 6:
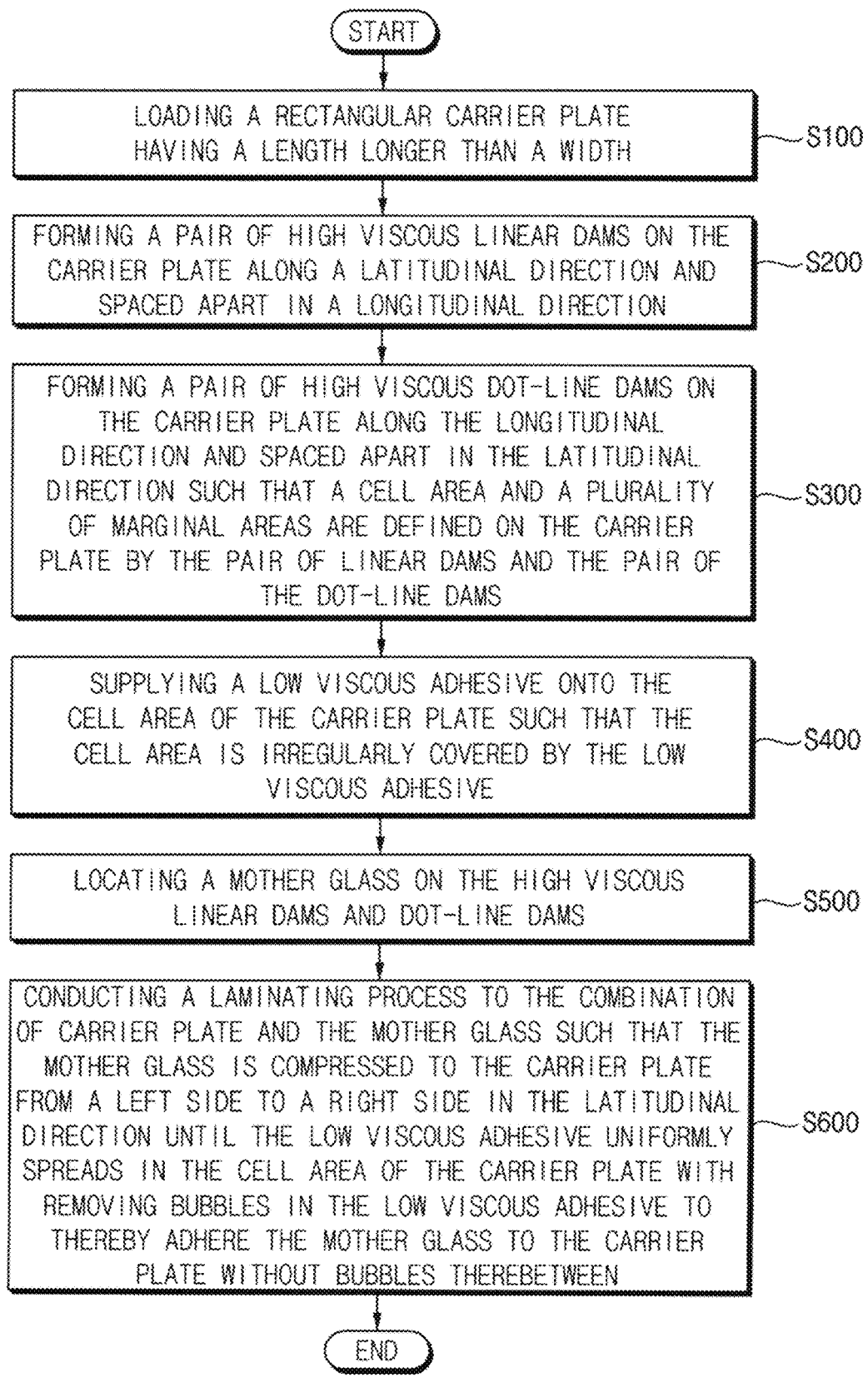
FIG. 6 is a flow chart showing an embodiment of a method of manufacturing the glass stack structure shown in FIGS. 1 to 3B.

FIG. 6 is a flow chart showing an embodiment of a method of manufacturing the glass stack structure shown in FIGS. 1 to 3B. FIGS. 7A to 7F are structural views illustrating processes of the method of manufacturing the glass stack structure shown in FIG. 6.

Figure 7A:
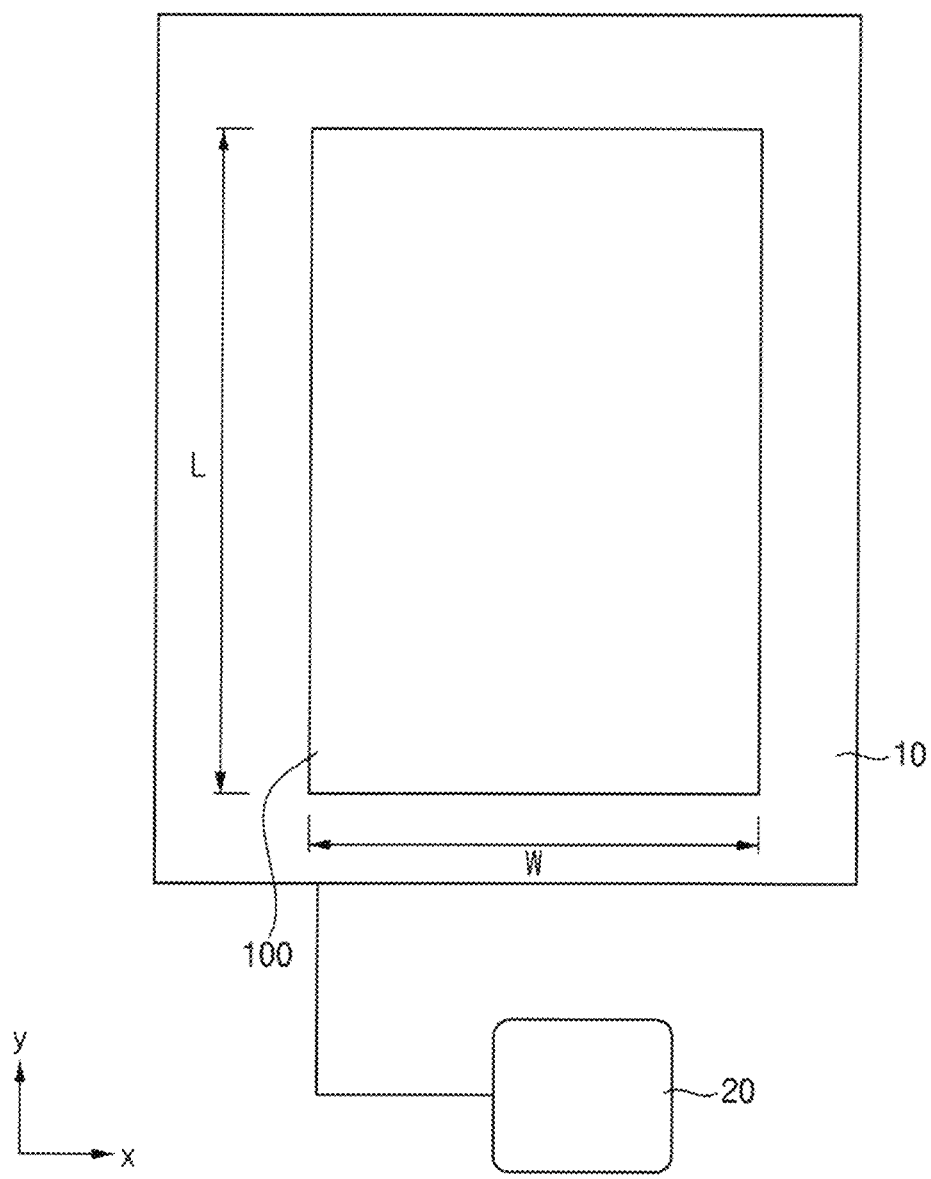
FIGS. 7A to 7F are structural views illustrating processes of the method of manufacturing the glass stack structure shown in FIG. 6.

Referring to FIGS. 6 and 7A, in an embodiment of a method of manufacturing the glass stack structure, the carrier plate 100 may be loaded onto a support 10 of a stack apparatus (S100). In an embodiment, the carrier plate 100 may include a rectangular plate having the carrier length L in the second direction y longer than the carrier width W in the first direction x.

The rectangular carrier plate 100 may be loaded onto the support 10 in a way such that the carrier length L may be perpendicular to the direction of the laminating process. When the lamination process is conducted along the first direction x and the bubbles are discharged or flow out of the carrier plate 100 in the first direction x, the bubbles may be discharged from the cell area C through a side thereof corresponding to the carrier length L more efficiently than through a side thereof corresponding to the carrier width W.

As the stack glass 200 may be formed on the carrier plate 100 in a subsequent process, the carrier plate 100 may have a sufficient flatness and rigidity for stacking the stack glass 200 thereon. Thus, the stack glass 200 may be arranged on the carrier plate 100 with high flatness and reliability.

In an embodiment, the carrier plate 100 may have substantially the same coefficient of linear expansion as the mother glasses 201 to 215 of the stack glass 200. Thus, the carrier plate 100 and the stack glass 200 may expand by a substantially same amount as each other in the subsequent heat treatment, so that no thermal stress may occur between the carrier plate 100 and the mother glasses 201 to 215 in the subsequent heat treatment. Therefore, the separation or the distortion between the mother glasses 201 to 215 and the carrier plate 100 in the subsequent heat treatment may be prevented in the glass stack structure 500.

In an embodiment, the carrier plate 100 may have the same materials as the mother glasses 201 to 215 and have a thickness of about 50 times to about 200 times the thickness of the individual mother glass 201 to 215.

A plurality of the plates may be stored in a carrier deck and one of the plates may be selected from the carrier deck as the carrier plate 100 in response to a stack signal. Then, the carrier plate 100 may be loaded onto the support 10 of the stack apparatus.

In one embodiment, for example, the stack apparatus may include a series of stack process routines for stacking a plurality of the mother glasses onto the carrier plate 100 and the support 10 for supporting the carrier plate 100 and the mother glasses 201 to 215. The support 10 may move from an input port to an output port by a moving driver such as a roller and a conveyer belt. The operation of the moving driver may be controlled by a driving power 20 and the support 10 may move to a proper process position according to the stack process routines.

Figure 7B:
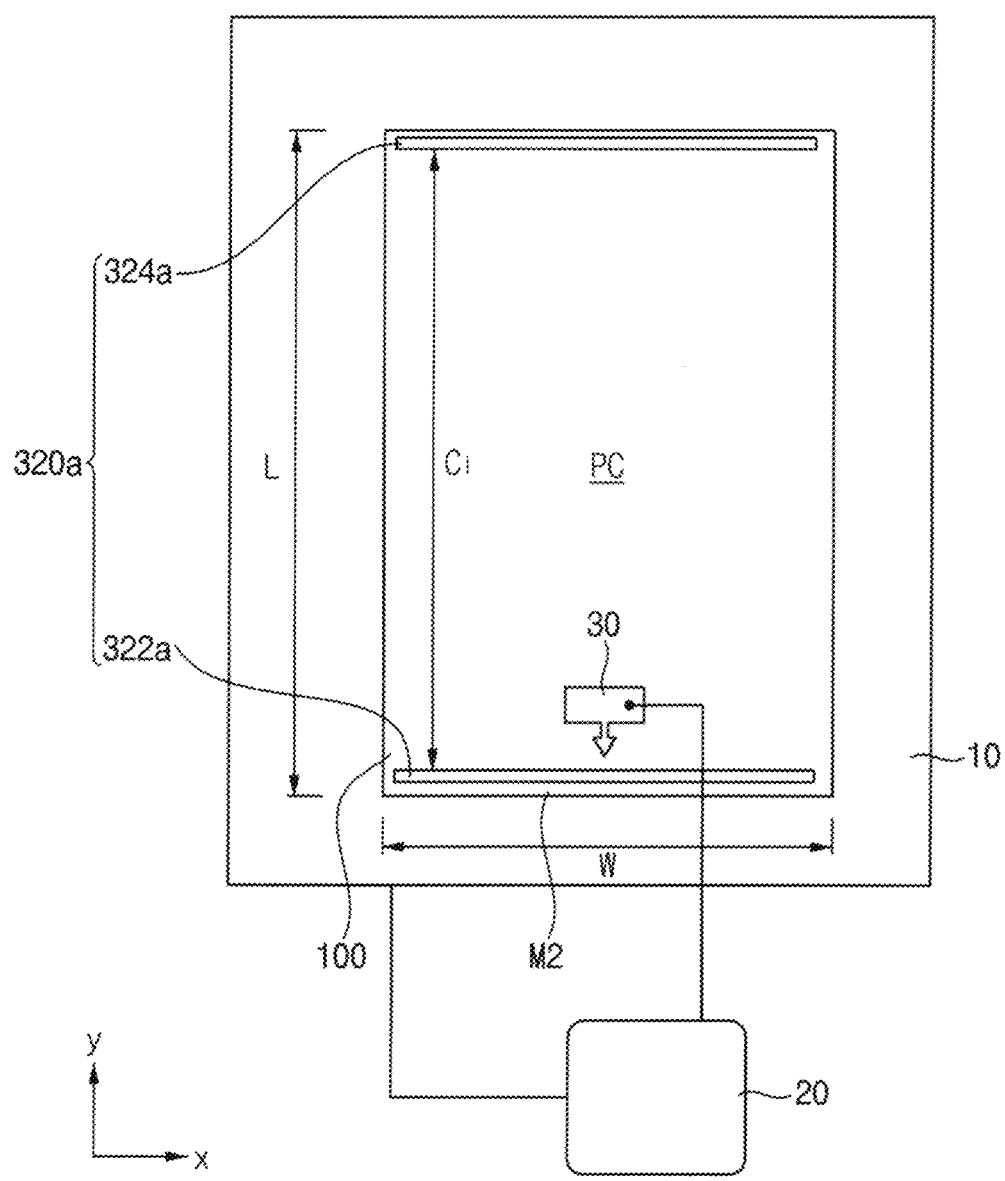

Referring to FIGS. 6 and 7B, a pair of high viscous linear dams 320a may be provided or formed on the carrier plate 100 in a way such that the pair of the high viscous linear dams 320a may extend in the first direction x and may be spaced apart from each other in the second direction y by a preliminary cell area PC (S200). Thus, the carrier plate 100 may be divided into the preliminary cell area PC that may be defined by the pair of the linear dams 320a and the second marginal area M2 outside of the linear dams 320a and corresponding to the upper and lower portions of the carrier plate 100.

In one embodiment, for example, an injection nozzle 30 operated by the driving power 20 may move in the first direction x over the lower portion of the carrier plate 100 and may inject the high viscous adhesive material onto the carrier plate 100. Thus, a lower linear dam 322a may be formed on the lower portion of the carrier plate 100.

Then, the injection nozzle 30 may move along the second direction y by a cell length $C_l$ in a way such that the injection nozzle 30 may be positioned over the upper portion of the carrier plate 100. Then, the injection nozzle 30 may move in the first direction x over the upper portion of the carrier plate 100 and may inject the high viscous adhesive material onto the carrier plate 100. Thus, an upper linear dam 324a may be formed on the upper portion of the carrier plate 100.

Thus, the surface area of the carrier plate 100 between the lower linear dam 322a and the upper linear dam 324a may be provided as the preliminary cell area PC, and the surface area of the carrier plate 100 between a lower edge of the carrier plate 100 and the lower linear dam 322a and the surface area of between an upper edge of the carrier plate 100 and the upper linear dam 324a may be provided as the second marginal area M2.

The high viscous adhesive material may include a gel state adhesive material having a viscosity of about 100,000 cp to about 1,000,000 cp and may be injected onto the carrier plate 100 in the gel state. Thus, the injection nozzle 30 may include a high pressure nozzle for sufficiently injecting the high viscous materials. In an embodiment, the high viscous adhesive material may include epoxy-based materials such as bisphenol F-type epoxy resin, for example.

The cell length $C_l$ may be controlled just by the moving distance of the injection nozzle 30 in the second direction y and thus the longitudinal size of the preliminary cell area PC may correspond to the moving distance of the injection nozzle 30. Accordingly, the moving distance of the injection nozzle 30 may be controlled based on the size of the cell area C of the glass stack structure 500.

Figure 7C:
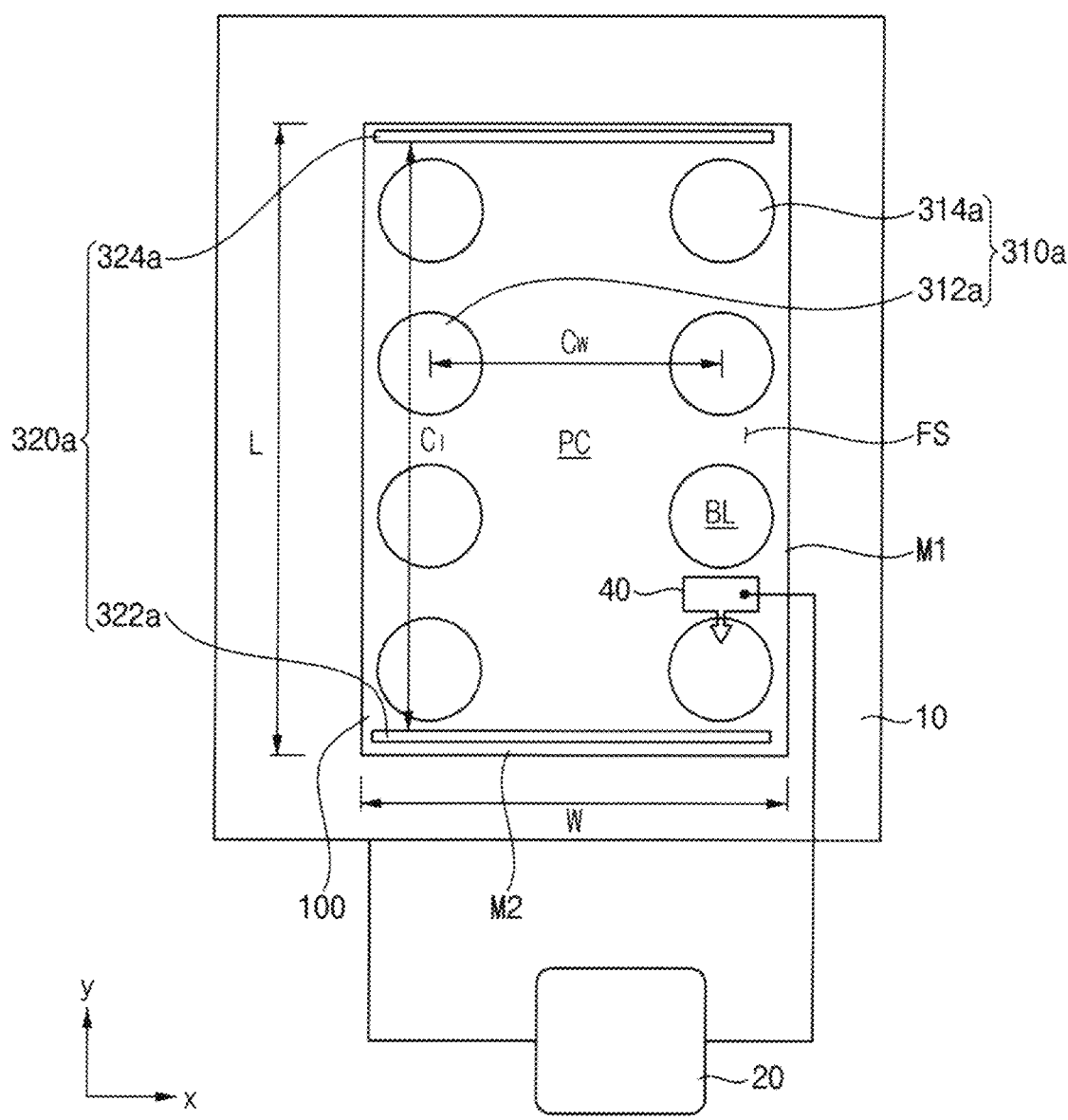

Referring to FIGS. 6 and 7C, a pair of high viscous dot-line dams 310a may be provided or formed on the carrier plate 100 in a way such that the pair of the high viscous dot-line dams 310a may be arranged in the second direction y and may be spaced apart from each other in the first direction x by the cell area C (S300). Thus, the preliminary cell area PC of the carrier plate 100 defined by the pair of the dot-line dams 310a may be formed into the cell area C, and the preliminary cell area PC of the carrier plate 100 outside of the pair of the dot-line dams 310a may be formed into the first marginal area M1. The first marginal area M1 may correspond to the left and right sides of the carrier plate 100. The high viscous adhesive material may be injected onto left and right peripheral portions of the carrier plate 100 at the same time interval, so that a plurality of the dot dams BL may be arranged in the second direction y by a same gap distance, and the gap space between the neighboring dot dams BL may be provided or defined as a flow space for flowing out the bubbles from the cell area C.

In one embodiment, for example, a pulse nozzle 40 operated by the driving power 20 may move in the second direction y over the left peripheral portion of the carrier plate 100 and may inject the high viscous adhesive material onto the carrier plate 100 at a predetermined injection period. The pulse nozzle 40 may move in the second direction y at a constant speed and the injection of the adhesive material may be activated at the injection period in response to a pulse signal.

In an embodiment, when the pulse signal is applied to the pulse nozzle 40, the pulse nozzle may inject the high viscous adhesive material onto the carrier plate 100 to thereby form the dot dam BL on the carrier plate 100. In such an embodiment, when no pulse signal is applied to the pulse nozzle 40, the pulse nozzle 40 may not inject the high viscous adhesive material and just move in the second direction y. In such an embodiment, the dot dam BL may not be formed on the carrier plate 100 in a way such that a gap space may be defined between a pair of the neighboring dot dams BL. The gap space between the neighboring dot dams BL may be provided or defined as the flow space FS through which the surface of the carrier plate 100 may be exposed.

Thus, the formation of the dot dams BL and not formation of the dot dam BL may be repeated in the second direction y at a predetermined pulse period and thus a plurality of the dot dams BL may be arranged on the left peripheral portion of the carrier plate 100 in the second direction with the same gap distance, to thereby form a left dot-line dams 312a on the left peripheral portion of the carrier plate 100. In the left dot-line dams 312a, the dot dams BL and the flow space FS may be alternately arranged in the second direction y.

Thereafter, the pulse nozzle 40 may move along the first direction x by the cell width $C_w$ in a way such that the pulse nozzle 40 may be positioned over the right peripheral portion of the carrier plate 100. Then, the pulse nozzle 40 may move in the second direction y over the right peripheral portion of the carrier plate 100 and may inject the high viscous adhesive material onto the carrier plate 100 at the same injection period. The pulse nozzle 40 may move in the second direction y at a constant speed and the injection of the adhesive material may be activated at the injection period in response to a pulse signal. Thus, a plurality of the dot dams BL may be arranged on the right peripheral portion of the carrier plate 100 in the second direction y with the same gap distance, to thereby form right dot-line dams 314a on the right peripheral portion of the carrier plate 100. In the right dot-line dams 314a, the dot dams BL and the flow space FS may be alternately arranged in the second direction y.

The preliminary cell area PC between the left and right dot-line dams 312a and 314a may be provided or defined as the cell area C of the glass stack structure 500, and the surface area of the carrier plate 100 between a left edge of the carrier plate 100 and the left dot-line dams 312a and the surface area of between a right edge of the carrier plate 100 and the right dot-line dams 314a may be provided or defined as the first marginal area M1.

The dot-line dams 310a and the linear dams 320a may include a same high viscous material as each other and may be provided as the high viscous adhesive line 300 enclosing the cell area C of the glass stack structure 500. The adhesive line 300 may be sufficiently resistive to the compression pressure of the laminating process due to the high viscosity, so that the first mother glass 201 may be adhered to the carrier plate 100 without any substantial breaks of the adhesive line 300.

Figure 9:
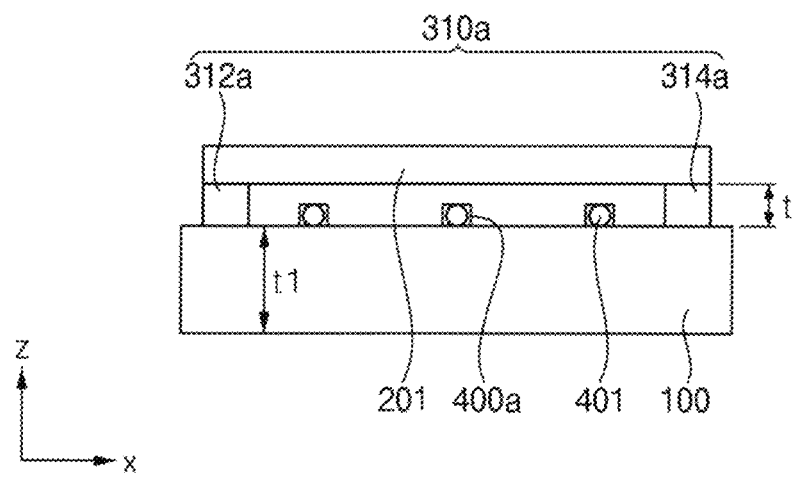
FIG. 9 is a cross sectional view illustrating a combination of the carrier plate shown in FIG. 7E and the first mother glass.

In an embodiment, the dot-line dams 310a and the linear dams 320a may have a proper initial thickness t (shown in FIG. 9). As described in detail hereinafter, when the low viscous adhesive material 400a may be injected onto the cell area C of the carrier plate 100, the first mother glass 201 may be positioned on the dot-line dams 310a and the linear dams 320a and then the compression force may be applied to the first mother glass 201.

If the initial thickness t of the dot-line dams 310a and the linear dams 320a is excessively large, a much larger amount of the high viscous adhesive material may fill into the flow space FS in the lamination process and thus the flow space FS may be filled with the high viscous adhesive material. Therefore, the bubbles may not be sufficiently discharged from the cell area C. In contrast, if the initial thickness t of the dot-line dams 310a and the linear dams 320a is excessively small, the adhesive spacer 401 may be protruded over the dot-line dams 310a and the linear dams 320a and thus the first mother glass 201 may not be sufficiently adhered to the carrier plate 100.

Therefore, in an embodiment, the initial thickness t of the dot-line dams 310a and the linear dams 320a may be in a range of about 50 μm to about 100 μm.

The cell width $C_w$ may be controlled just by the moving distance of the pulse nozzle 40 in the first direction x and thus the latitudinal size of the cell area C may correspond to the moving distance of the pulse nozzle 40. Accordingly, the moving distance of the pulse nozzle 40 may be controlled based on the size of the cell area C of the glass stack structure 500.

The configurations of the dot-line dams 310a may be changed by controlling a dam length Da of each dot dam BL in the first direction x, a dam width Db of each dot dam BL in the second direction y and a gap distance Dc between the neighboring dot dams BL in the second direction y.

In the subsequent laminating process, the dot dam BL may prevent the low viscous adhesive material from overflowing from the cell area C to the first marginal area M1 and the bubbles in the low viscous adhesive material may flow out or be discharged from the cell area C through the flow space FS. Therefore, the size of the dot dams BL may have significant effect on the leakage or overflow of the low viscous adhesive material from the cell area C, and the size of the gap distance Ds between the neighboring dot dams BL may have significant effect on the removal of the bubbles from the cell area C. That is, sizes of the dot dams BL and the flow space FS of the dot-line dams 310a may be determined based on the leakage characteristics of the low viscous adhesive material and the removal characteristics of the bubbles in the low viscous adhesive material.

Figure 8A:
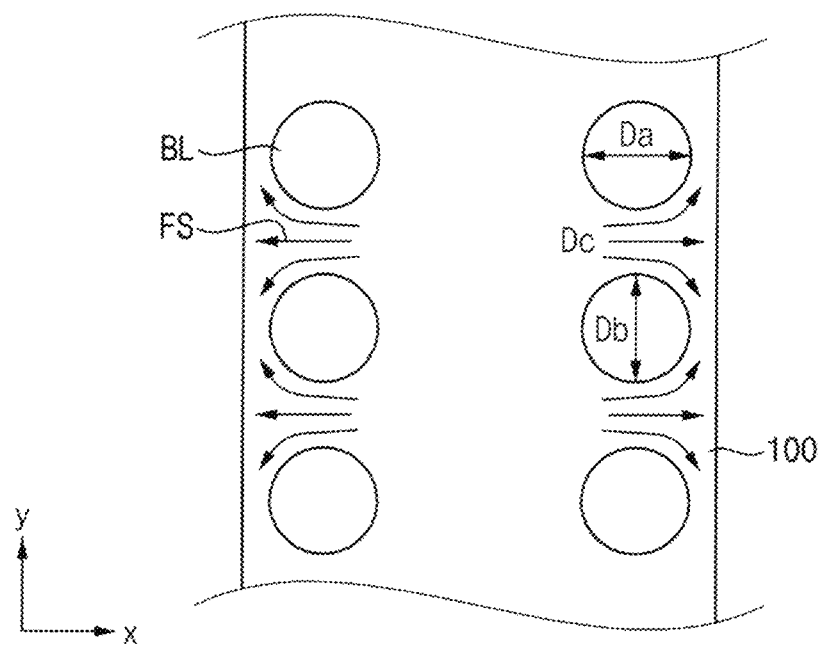
FIG. 8A is a plan view illustrating the dot-line dams of the high viscous adhesive line shown in FIG. 7C according to an embodiment.
Figure 8B:
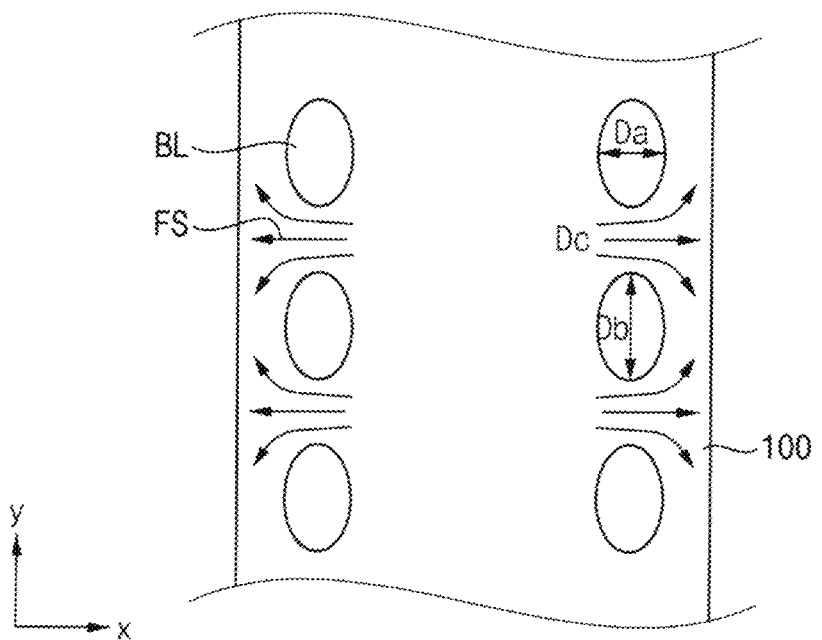
FIG. 8B is a plan view illustrating an alternative embodiment, where the dot-line dams of the high viscous adhesive line shown in FIG. 7C are modified.
Figure 8C:
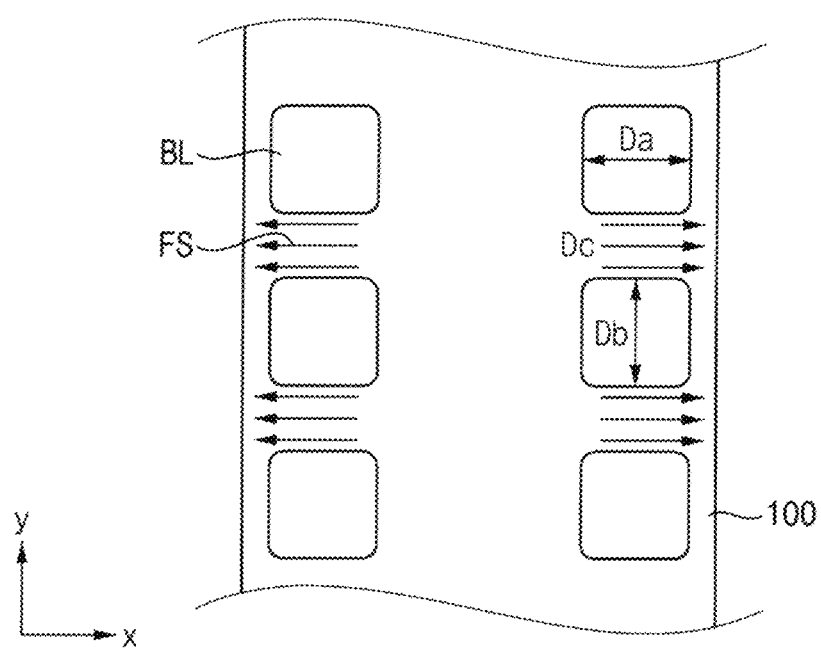
FIG. 8C is a plan view illustrating another alternative embodiment, where the dot-line dams of the high viscous adhesive line shown in FIG. 7C are modified.

FIG. 8A is a plan view illustrating the dot-line dams of the high viscous adhesive line shown in FIG. 7C according to an embodiment. FIG. 8B is a plan view illustrating an alternative embodiment, where the dot-line dams of the high viscous adhesive line shown in FIG. 7C are modified, and FIG. 8C is a plan view illustrating another alternative embodiment, where the dot-line dams of the high viscous adhesive line shown in FIG. 7C are modified.

Referring to FIG. 8A, in an embodiment, the dot dams BL in the dot-line dams 310a may be shaped into a circle in a way such that the dam length Da may be the same as the dam width Db. In such an embodiment, the gap distance Dc between the neighboring circular dot dams BL may decrease to a minimal gap distance and then increase from the minimal gap distance from the cell area C to the first marginal area M1. The neighboring circular dot dams BL may be spaced apart from each other by the minimal gap distance at a proximate point. Thus, the size of the flow space FS may decrease gradually from the cell area C to a narrow point corresponding to the minimal gap distance and then increase from the narrow point to the first marginal area M1. In such an embodiment, an inlet portion of the flow space FS in which the bubbles may flow into the flow space FS may be narrowed toward the narrow point and an outlet portion of the flow space FS in which the bubbles may flow out to the first marginal area M1 may be widened toward the first marginal area M1. Accordingly, the velocity of the bubbles may increase gradually to the narrow point in the inlet portion and decrease gradually to the first marginal area M1 in the outlet portion.

Thus, the flow characteristics of the bubbles may be determined by the shape of the flow space FS, and the shape of the flow space FS may be determined by the gap distance Dc and the shape of the dot dam BL. Therefore, gap distance Dc and the shape of the dot dam BL may be determined based on the flow characteristics of the bubbles in the flow space FS. In one embodiment, for example, the gap distance Dc between the neighboring dot dams BL may be about 0.3 times to about 1.0 times the dam length Da of the dot dam BL.

If the gap distance Dc is smaller than 0.3 times the dam length Da, the flow space may be so small that the bubbles may be reflected from the dot dam BL toward the cell area C at a boundary area between the cell area C and the dot dam BL. That is, the bubbles may not be sufficiently discharged from the cell area C and may flow reversely into the cell area C, which is widely known as the suck back defect.

The bubbles may remain at the boundary area of the cell area C and the dot dams BL due to the suck back defect and the size of the cell area C may be reduced as large as the remaining area of the bubbles at the boundary area. The size reduction of the cell area C may reduce the size of the glass stack structure 500.

If the gap distance Dc is greater than 1.0 times the dam length Da, the flow space may be so large that the low viscous adhesive material may also be discharged from the cell area C together with the bubbles and may be overflowed onto the support 10. Thus, the support 10 and other components of the stack apparatus may be contaminated from the low viscous adhesive material in the laminating process.

The overflowed adhesive material may function as particles in a next glass stack process in a same stack apparatus and the stack defects may increase in the glass stack process due to the particles.

Accordingly, in an embodiment of the invention, the gap distance Dc between the neighboring dot dams BL may be about 0.3 times to about 1.0 times the dam length Da of the dot dam BL.

The shape of the dot dam BL may be variously modified according to a ratio of the dam length Da and the dam width Db as long as the dam length Da may be greater than or equal to the dam width Db. If the dam length Da may be smaller than the dam width Db, most of the low viscous adhesive material may be discharged from the cell area C and the stack apparatus including the support 10 may be contaminated by the low viscous adhesive material.

In an embodiment, the dot dam BL may be shaped into a circle as illustrated in FIG. 8A where the dam length Da may be equal to the dam width Db. In an alternative embodiment, the dot dam BL may be shaped into an eclipse as illustrated in FIG. 8B where the dam length Da may be greater than the dam width Db.

In another alternative embodiment, as shown in FIG. 8C, the dam length Da may be greater than the dam width Db and the dot dam BL may be shaped into a square such that the side profile of the flow space FS may be uniform, and the velocity of the bubbles may be constant in the flow space FS.

The uniformity of the adhesive layer 400 in the cell area C may be influenced by the discharge velocity of the bubbles. Thus, the discharge velocity of the bubbles may be controlled for improving the uniformity of the adhesive layer 400 in the cell area C. However, the discharge velocity of the bubbles may be limited to a maximum value at which the low viscous adhesive material may be overflowed out of the carrier plate 100 and the stack apparatus including the support 10 may be contaminated by the low viscous adhesive material.

Figure 7D:
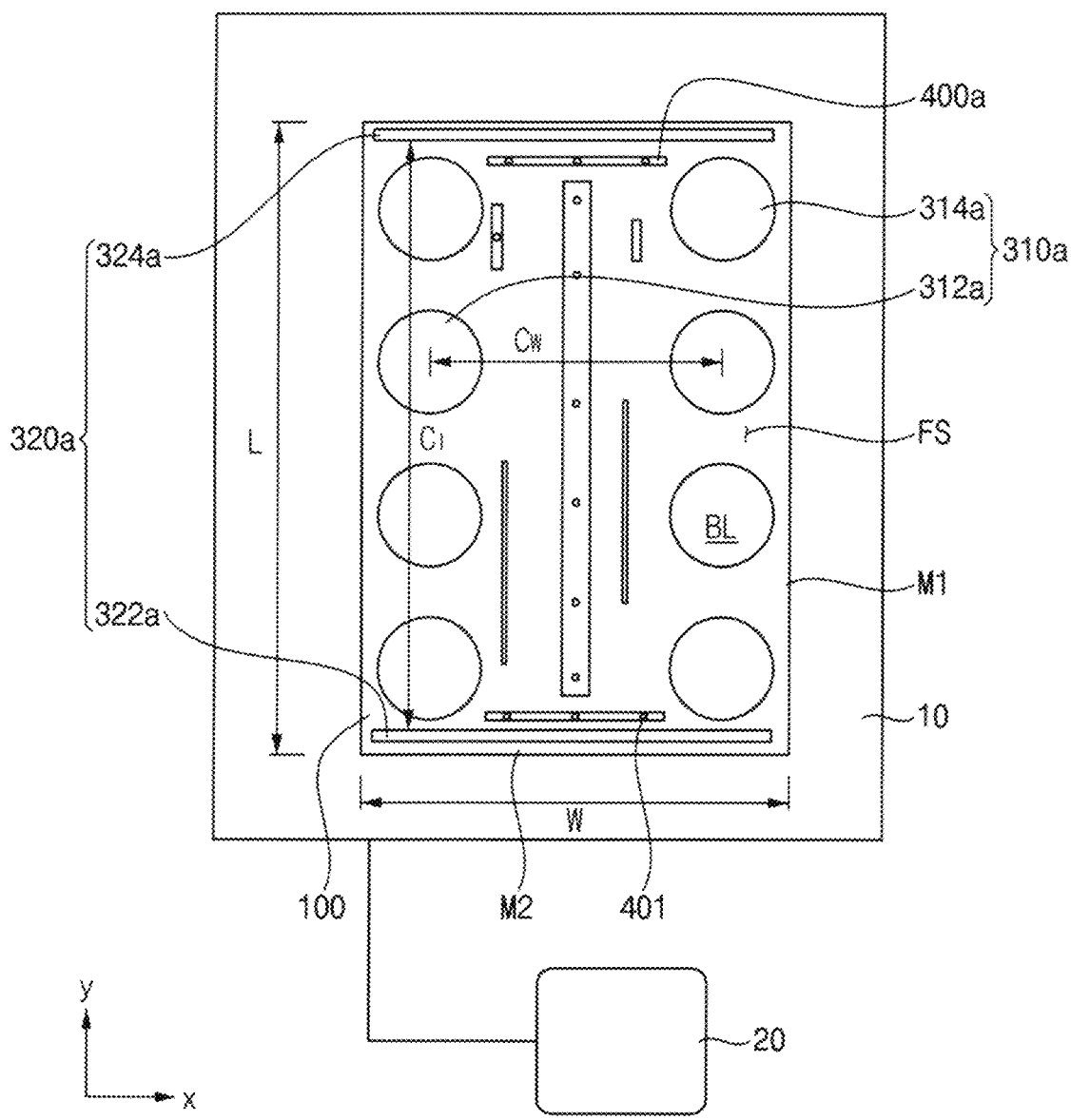

Referring now to FIGS. 6 and 7D, the low viscous adhesive material may be supplied onto the cell area C of the carrier plate 100 in a way such that the cell area C may be irregularly covered by the low viscous adhesive material (S400).

In one embodiment, for example, the low viscous adhesive material may be stored in a dispenser (not shown) in a sol state and the dispenser may move in the first direction x or the second direction y by the driving power 20. In an embodiment, the dispenser may include a supplier for supplying the sol state adhesive material onto the cell area C at a constant rate.

When the dot-line dams 310a and the linear dams 320a may be formed on the carrier plate 100 and the cell area C may be defined by the dot-line dams 310a and the linear dams 320a, the driving power 20 may drive the dispenser to irregularly inject the low viscous adhesive material onto the cell area C. Thus, a low viscous adhesive 400a may be irregularly arranged on the cell area C of the carrier plate 100.

The low viscous adhesive 400a may have such a low viscosity that the low viscous adhesive 400a may be sufficiently effectively spread on a whole cell area C in the subsequent laminating process. Thus, the low viscous adhesive 400a may be formed into the adhesive layer 400 in the laminating process. In one embodiment, for example, the low viscous materials may include the viscosity of about 1,000 cp to about 10,000 cp. In one embodiment, for example, the low viscous adhesive material may include urethane-based materials such as acrylate.

In an embodiment, the low viscous adhesive 400a may include a plurality of spacers 401 for separating the first mother glass 201 from the carrier plate 100 by the stack gap. In one embodiment, for example, the spacer 401 may include an inorganic particle having a size of about 30 μm to about 60 μm and may be sufficiently resistive to the compression force in the laminating process. Thus, the shape of the spacer 401 may be substantially unchanged in the laminating process and the first mother glass 201 and the carrier plate 100 may be spaced apart by the stack gap corresponding to the size of the spacer 401.

Figure 7E:
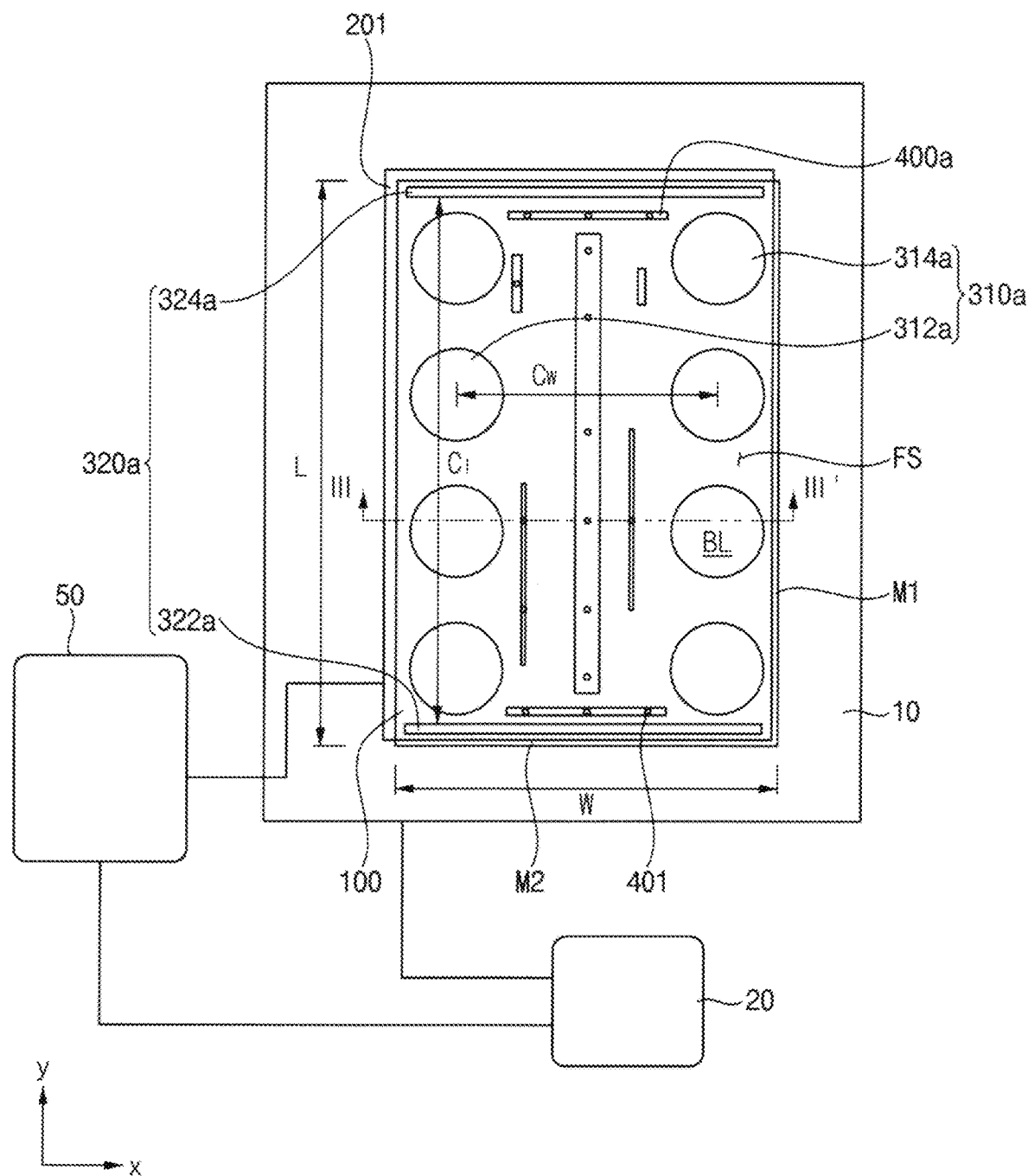
Figure 10:
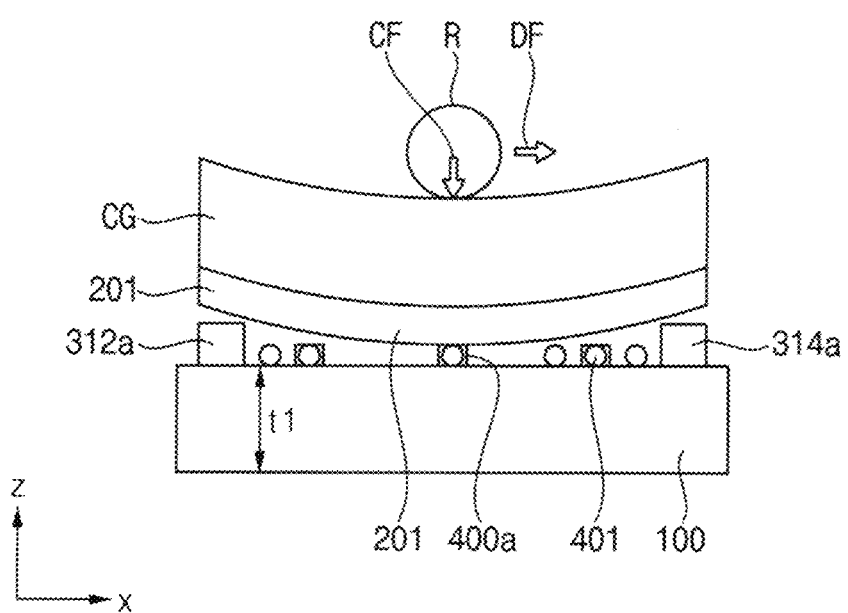
FIG. 10 is a view illustrating a laminating process for combining the carrier plate to the first mother glass shown in FIG. 9.

FIG. 9 is a cross sectional view illustrating a combination of the carrier plate shown in FIG. 7E and the first mother glass, and FIG. 10 is a view illustrating the laminating process for combining the carrier plate to the first mother glass shown in FIG. 9. FIG. 9 is a cross sectional view taken along line of FIG. 7E.

Referring to FIGS. 6, 7E and 9, the first mother glass 201 may be located or positioned on the dot-line dams 310a and the linear dams 320a (S500). In one embodiment, for example, a plurality of the mother glasses may be individually formed by a series of glass formation processes and may be stored in the glass transfer deck 50. Then, the glass transfer deck 50 may be transferred to a side of the support 10 and the mother glass may be individually picked up and loaded onto the carrier plate 100 by a transfer robot (not shown) from the glass transfer deck 50. In an embodiment, first to fifth mother glasses 201 to 215 may be individually and sequentially picked up and loaded on and over the carrier plate 100. At a first process for stacking the mother glass onto the carrier plate 100, the first mother glass 201 may be picked up from the glass transfer deck 50 and be loaded on the dot-line dams 310a and the linear dams 320a in a way such that a central line of the first mother glass 201 may be aligned with a central line of the carrier plate 100.

In such an embodiment, the first mother glass 201 may make contact only with the dot-line dams 310a and the linear dams 320a or may make contact with the low viscous adhesive 400a as well as with the dot-line dams 310a and the linear dams 320a based on the injection manner of the low viscous adhesive material onto the cell area C of the carrier plate 100.

When the first mother glass 201 may be sufficiently well positioned on the dot-line dams 310a and the linear dams 320a, the transfer robot may be returned to a standby area and the laminating process for combining the first mother glass 201 to the carrier plate 100 may be initiated.

Figure 7F:
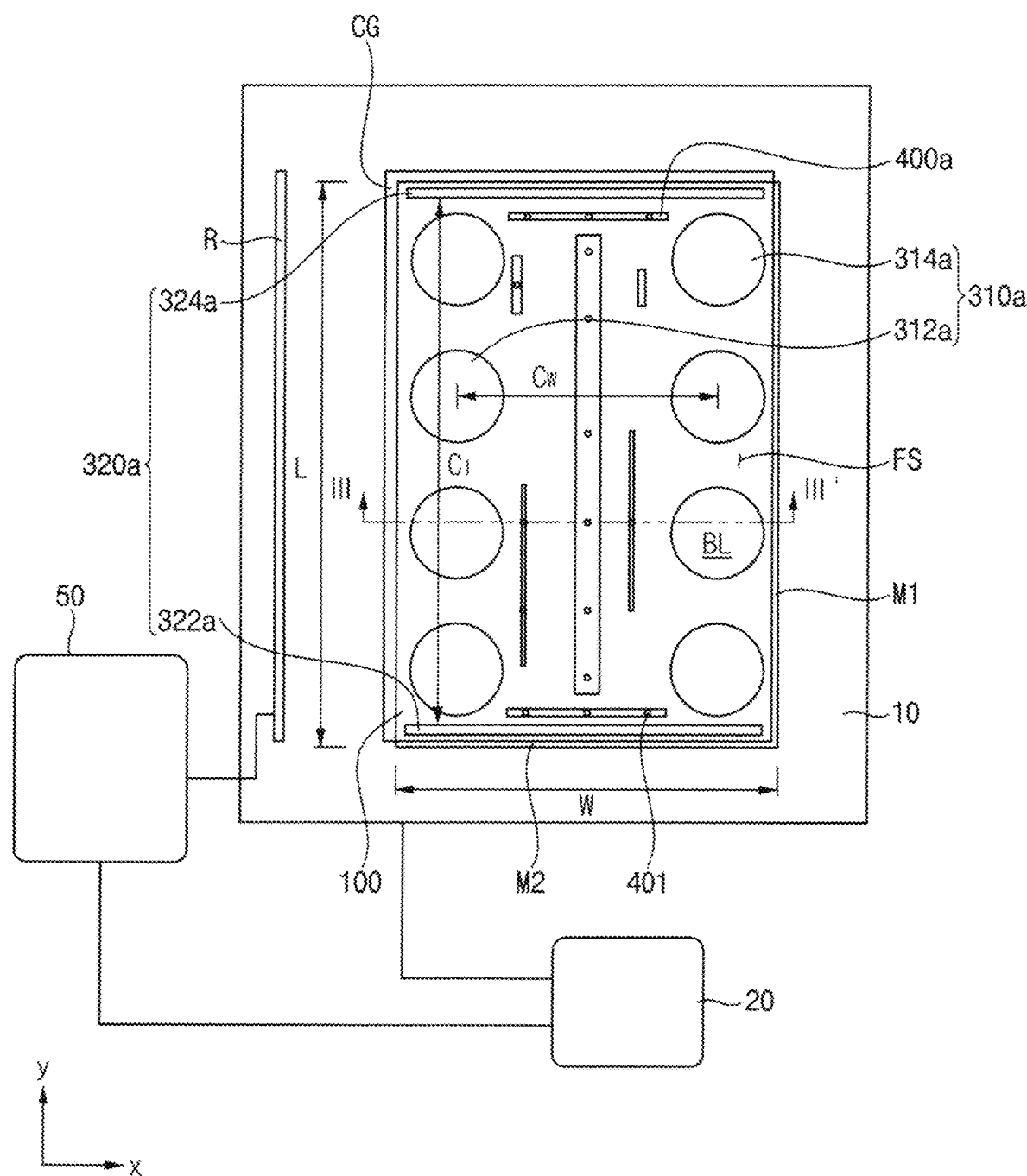

Referring to FIGS. 6, 7F and 10, the laminating process may be conducted for the first mother glass 201 in a way such that the first mother glass 201 may be compressed to the carrier plate 100 from the left portion to the right portion of the carrier plate 100 at a predetermined compression force CF, until the low viscous adhesive 400a is uniformly spread in the whole cell area C of the carrier plate 100 and the bubbles in the viscous adhesive 400a are effectively removed from the cell area C through the flow space FS to thereby adhere the mother glass 201 to the carrier plate 100 without bubbles (S600).

The first mother glass 201 may be combined to the carrier plate 100 by one of various bonding or adhesion processes determined based on the requirements and configurations of the glass stack structure 500. In one embodiment, for example, the first mother glass 201 may be combined to the carrier plate 100 by a mechanical joining process or may be adhered to the carrier plate 100 by the laminating process by the adhesives.

In an embodiment, the first mother glass 201 may be adhered to the carrier plate 100 by the low viscous adhesive layer 400 and the high viscous adhesive line 300 through the laminating process.

Figure 11:
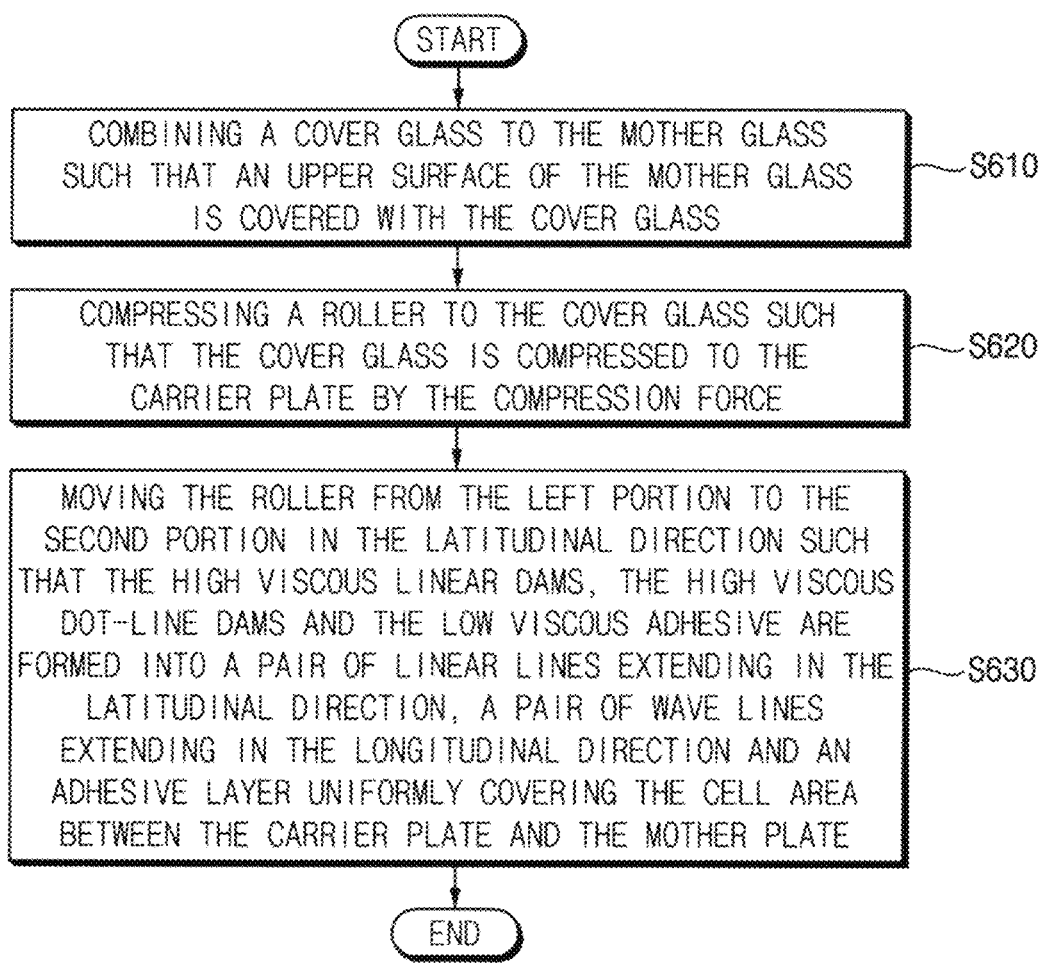
FIG. 11 is a flow chart showing an embodiment of the laminating process for combining the first mother glass 201 to the carrier plate 100 shown in FIG. 6.

FIG. 11 is a flow chart showing an embodiment of the laminating process of combining the first mother glass 201 to the carrier plate 100 shown in FIG. 6.

Referring to FIG. 11, a cover glass CG may be combined to the first mother glass 201 in a way such that an upper surface of the first mother glass 201 is covered by the cover glass CG (S610).

When the laminating process is initiated in the stack apparatus, the cover glass CG may be picked up from the glass transfer deck 50 and may be adhered to the upper surface of the first mother glass 201. In one embodiment, for example, the cover glass CG may be automatically picked up from the glass transfer deck 50 by using a robot arm and may be automatically combined to the first mother glass 201 by a combining technique.

Then, as show in FIG. 10, a roller R may be compressed to the cover glass CG in a way such that the cover glass CG may be compressed to the carrier plate 100 by the compression force CF (S620), and the roller R may move on the cover glass CG from the left portion to the right portion of the carrier plate 100 in the first direction x by a driving force DF to thereby make the first mother glass 201 to adhere to the carrier plate 100 by a pair of the wave lines 310, a pair of the linear lines 320 and the adhesive layer 400 (S630).

In one embodiment, for example, the roller R may include a hot roller that may be self-heated by a built-in heater and may have a length longer than the cell length Ci in the second direction y. Thus, the roller R may make simultaneous contact with a length-wise contact area of the cover glass CG in the second direction y.

In an embodiment, the roller R may be arranged at the left portion of the carrier plate 100 adjacent to the left dot-line dams 312a and may move to the right portion of the carrier plate 100 in the first direction x, while the cover glass CG is compressed by the roller R.

Therefore, the low viscous adhesive 400a may be compressed by the compression force CF and be uniformly spread on the whole cell area C to thereby form the adhesive layer 400 on the cell area C of the carrier plate 100. The bubbles in the low viscous adhesive 400a may flow out of the cell area C through the flow space FS of the right dot-line dams 314a while the roller R may compressively move to the right portion of the carrier plate 100. Therefore, no bubbles or sufficiently less bubbles may remain in the adhesive layer 400 and the first mother glass 201 may be effectively adhered to the carrier plate 100 by the adhesive layer 400 without bubbles in the cell area C.

In such an embodiment, the high viscous dot-line dams 310a and the high viscous linear dams 320a may be partially compressed into a pair of the wave lines 310 extending in the second direction y and a pair of the linear lines 320 extending in the first direction x. The wave lines 310 and the linear lines 320 may be arranged around the cell area C and the peripheral portions of the first mother glass 201 and the carrier plate 100 may be adhered to each other by the wave lines 310 and the linear lines 320.

Accordingly, in such an embodiment, the central portions of the first mother glass 201 and the carrier plate 100 may be adhered to each other by the low viscous adhesive layer 400 and the peripheral portions of the first mother glass 201 and the carrier plate 100 may be adhered to each other by the high viscous dot-line dams 310a and the linear dams 320a.

The bubbles in the low viscous adhesive 400a may be removed from the cell area C in the first direction x as the roller R may compressively move in the first direction x and no bubbles may be removed from the cell area C in the second direction y. Thus, the linear dams 320a may function just as a barrier for minimizing the overflow of the low viscous adhesive 400a to the second marginal area M2 and confining the adhesive layer 400 within the cell area C. Accordingly, the shape change of the linear dams 320a caused by the compression force CF may be minimized in the laminating process and the linear dams 320a may be formed into the straight lines 320 at the upper and lower portions of the carrier plate 100. The low viscous adhesive 400a may be spread uniformly along the whole cell area C by the compression force CF in the laminating process without any significant overflows into the marginal area M, to thereby form the adhesive layer 400 uniformly covering the cell area C.

In an embodiment, the dot-line dams 310a may include a plurality of dot dams BL and a plurality of flow space FS between the neighboring dot dams BL in the second direction y. Thus, the low viscous adhesive 400a may be prevented from being overflowed to the first marginal area M1 by the dot dams BL and the bubbles in the low viscous adhesive 400a may be discharged or flow out to the first marginal area M1 through the flow space FS.

Thus, when the dot-lines dams 310a are compressed by the roller R, the dot dam BL may be compressed by the roller R and some of the dot dam BL may be extracted into the neighboring flow space FS. In such an embodiment, the extractions of the dot dam BL may be arranged in the flow spaced FS according to the behaviors of the bubbles discharged to the first marginal area M1 through the flow space FS. In such an embodiment, the extractions of the dot dams BL may be arranged in the flow space FS according to the behaviors of the bubbles and the flow space may be filled with the extractions of the dot dams BL.

The dot-line dams 310a may be compressed into the wave lines 310 by the roller R in the laminating process in a way such that the wave line 310 may include a plurality of the body portions B having a first width w1 in the first direction x and a plurality of extended portions E having a second width w2 smaller than the first width w1 in the first direction x. The extractions of the neighboring dot dams BL may be connected to the flow space FS between the neighboring dot dams BL to thereby form the extended portion E of the wave line 310 and the residuals of the dot dam BL may be formed into the body portion B of the wave line 310. In such an embodiment, the extractions of the dot dam BL are residuals extracted from the dot dam BL, such that the width of the extractions may be smaller than the dam BL itself. Thus, the second width w2 of the extended portion E may be smaller than the first width w1 of the dot dam BL. In such an embodiment, the dot dams BL and the flow space FS may be alternately arranged on the carrier plate 100 in the second direction y, such that the body portions B and the extended portions E may also be alternately arranged on the carrier plate 100 in the second direction y. Thus, the series of the alternate body portions B and the extended portions E may be formed into the wave lines 310.

In an embodiment, the wave lines 310, the straight lines 320 and the adhesive layer 400 may be positioned under the first mother glass 201 and be compressed under the same compression force CF, so that the wave lines 310, the straight lines 320 and the adhesive layer 400 may have a same thickness as each other. In an embodiment, the adhesive layer 400 may include the spacers 401 and the wave lines 310, the straight lines 320 and the adhesive layer 400 may have a minimal thickness corresponding to the size of the spacers 401. In one embodiment, for example, the thickness of the wave lines 310, the straight lines 320 and the adhesive layer 400 may be in a range of about 30 μm to about 60 μm. Therefore, the first mother glass 201 may be adhered to the carrier plate 100 without any deteriorations of the flatness.

As the cell area C may be communicated with the first marginal are M1 via the flow space FS, some of the low viscous adhesive 400a may be discharged to the first marginal area M1 via the flow space FS together with the bubbles, to thereby further form the edge adhesive 420 on the first marginal area M1 adjacent to the second length-defining line 314. Thus, the adhesive layer 400 may include the cell adhesive 410 covering the cell area C and the edge adhesive 420 covering the first marginal area M1. The edge adhesive 420 may not be provided as long as the leakage or overflow of the low viscous adhesive 400a may be sufficiently prevented.

In an embodiment, the flow space FS may be provided with the dot-line dams 310a, the bubbles may be sufficiently removed from the cell area C in the laminating process and the suck back defect may be sufficiently prevented around the dot-line dams 310a. In such an embodiment, the reverse flow of the bubble into the cell area C may be sufficiently prevented in the laminating process.

If the bubbles are reflected from the dot dams BL and flow reversely into the cell area C, the bubbles may not be removed from the boundary area of the cell area C and the dot dams BL. In such a case, the first mother glass 201 may not be sufficiently adhered to the carrier plate 100 at the boundary area of the cell area C and the dot dams BL, and an adherence defect may occur at the boundary area of the cell area C and the dot dams BL. That is, the glass stack structure 500 may have the adherence defects and the size of an effective cell area may be reduced in the glass stack structure 500. In an embodiment, as described above, the bubbles may be sufficiently removed from the cell area C via the flow space FS of the dot-line dams 310a and the reverse flow of the bubble may be prevented in the laminating process. Accordingly, the adherence defects may be minimized in the glass stack structure 500 and the effective cell area of the glass stack structure 500 may be maximized.

The shape and configurations of the edge adhesive 420 may be varied according to the shape and configurations of the dot-line dams 310a.

The behaviors of the bubbles in the laminating process may be determined based on the dam length and dam width Da and Db of the dot dam BL and the gap distance Dc between the neighboring dot dams BL, and the distributions of the discharged low viscous adhesive 400a in the first marginal area M1 may be determined by the behaviors of the bubbles.

Thus, in an embodiment, the overflow of the low viscous adhesive 400a via the flow space FS may be prevented or minimized just by controlling the configurations of the dot-line dams 310a and thus the shape and configurations of the edge adhesive 420 may be determined by the configurations of the dot-line dams 310a.

In an embodiment, the dot dam BL may be formed into a circle or an ellipse shape in a way such that the dam length Da may be greater than the gap distance Dc, and the wave line 310 may be formed into the wave shape having a plurality of the body portions B and the extended portions E that may be alternately arranged on the carrier plate 100 in the second direction y. In such an embodiment, the edge adhesive 420 may also be formed into a curved line having a plurality of concave portions EL1 adjacent to the respective body portion B and a plurality of the convex portions EL2 adjacent to the respective extended portion E. In such an embodiment, the edge adhesive 420 may be arranged on the first marginal area M1 as the continuous curved line in which the concave portions EL1 and the convex portions EL2 may be alternately arranged in the second direction y.

Thereafter, the high viscous dot-line dams 310a, the high viscous linear dams 320a and the low viscous adhesive 400a may be formed on the first mother glass 201 by a same processes as those described above in detail with references to FIGS. 7A to 7D. Then, the second mother glass 202 may be positioned on the high viscous dot-line dams 310a, the high viscous linear dams 320a and the low viscous adhesive 400a and a same laminating process as that described above in detail with references to FIGS. 7E and 7F may be conducted to the second mother glass 202. Accordingly, the second mother glass 202 may be adhered to the first mother glass 201 by the high viscous adhesive line 300 and the low viscous adhesive layer 400.

The above processes as described in detail with references to FIGS. 7A to 7F may be repeated until the third mother glass 203 to the fifth mother glass 215 are sequentially adhered to each other, to thereby form the stack glass 200 on the carrier plate 100. Thereafter, the protection plate 490 may be adhered to the fifth mother glass 215 (the uppermost mother glass).

In an embodiment, a hardening process may be further conducted to the adhesive line 300 and the adhesive layer 400 after the laminating process is completed. Thus, the wave lines 310, the linear lines 320 and the adhesive layer 400 may be sufficiently hardened between the carrier plate 100 and the mother glasses 201 to 215. In an embodiment, the hardening process may be repeatedly conducted whenever each laminating process is completed to each of the mother glasses. Alternatively, the hardening process may be conducted once when the carrier plate 100 and the mother glasses 201 to 215 are adhered to each other.

In an embodiment, the same reference numerals 300 and 400 denote the high viscous adhesive line and the low viscous adhesive layer, respectively, regardless of the mother glass and the carrier plate on which the high viscous adhesive line and the low viscous adhesive layer.

According to embodiments of the manufacturing method of the glass stack structure 500, the cell area C of the carrier plate 100 on which the low viscous adhesive 400a may be arranged in a sol state may be defined by the dot-line dams 310a extending in the second direction y. The dot-line dams 310a may include a plurality of dot dams BL and a plurality of flow spaces FS between the neighboring dot dams BL. When the laminating process is conducted in the first direction x perpendicular to the second direction y, the leakage or the overflow of the low viscous adhesive 400a may be sufficiently prevented by the dot dams BL in the laminating process. Thus, the stack apparatus including the support may be prevented from contamination caused by the low viscous adhesive 400a in the laminating process. In such embodiments, the bubbles in the low viscous adhesive 400a may be sufficiently effectively discharged from the cell area C via the flow space FS, and the suck back defect may be sufficiently prevented around the dot-line dams 310a. Accordingly, the effective cell area of the glass stack structure 500 may be maximized.

According to embodiments of the invention, the mother glass may be adhered to the carrier plate by the high viscous adhesive line 300 at the peripheral areas of the glass stack structure 500 and the low viscous adhesive layer 400 at the cell areas C (central areas) of the glass stack structure 500 in the laminating process. The cell area C, on which the low viscous adhesive 400a is arranged, may be defined by the dot-line dams 310a extending in the second direction y and the dot-line dams 310a may be formed into the wave lines 310 of the adhesive line 300 by the compression force CF in the laminating process. The dot-line dams 310a may include a plurality of dot dams BL and a plurality of flow spaces FS.

The low viscous adhesive 400a may be effectively prevented from being leaked or overflowed out of the carrier plate 100 by the dot dams BL and the bubbles in the low viscous adhesive 400a may be sufficiently discharged through the flow space FS in the lamination process for adhering the mother glass to the carrier plate 100. Thus, the suck back defect may be effectively prevented around the dot-line dams 310a and the effective cell area of the glass stack structure 500 may be maximized.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A glass stack structure comprising:
a carrier plate having a carrier width in a first direction, a carrier length in a second direction perpendicular to the first direction, and a first thickness in a third direction perpendicular to the first direction and the second direction;
a stack glass on the carrier plate and including a plurality of mother glasses sequentially stacked on the carrier plate, wherein each of the mother glasses has a second thickness less than the first thickness;
a plurality of adhesive lines including a high viscous material and arranged at peripheral portions of the carrier plate and the mother glasses, wherein the carrier plate and the mother glasses are adhered to each other at the peripheral portions by the adhesive lines, and the adhesive lines includes a pair of wave lines extending in the second direction and spaced apart from each other in the first direction and a pair of linear lines extending in the first direction and spaced apart from each other in the second direction; and
an adhesive layer including a low viscous material and covering a cell area of the carrier plate and the mother glasses, wherein the carrier plate and the mother glasses are adhered to each other at the cell area by the adhesive layer, and the cell area is defined by the pair of the wave lines and the pair of the linear lines.

2. The glass stack structure of claim 1, wherein
the adhesive line has a viscosity in a range of about 100,000 cp to about 1,000,000 cp, and
the adhesive layer has a viscosity in a range of about 1,000 cp to about 10,000 cp.

3. The glass stack structure of claim 2, wherein the adhesive line includes bisphenol F-type epoxy resin, and the adhesive layer includes urethane acrylate.

4. The glass stack structure of claim 1, wherein the adhesive layer includes a plurality of inorganic spacers interposed between the neighboring mother glasses and between the carrier plate and a lowermost mother glass of the stack glass, and a gap distance is defined between the carrier plate and the mother glasses by the inorganic spacers.

5. The glass stack structure of claim 4, wherein the spacer includes a particle having a size in a range of about 30 μm to about 60 μm.

6. The glass stack structure of claim 1, wherein
the wave line includes a plurality of body portions having a first width and a plurality of extended portions having a second width smaller than the first width, and
the body portions and the extended portions are alternately arranged in the second direction.

7. The glass stack structure of claim 6, wherein
the adhesive layer includes an edge adhesive arranged on an outside of the wave line opposite to cell area,
the edge adhesive includes a plurality of concave portions adjacent to the body portions and a plurality of convex portions adjacent to the extended portions, and
the concave portions and the convex portions are alternately arranged into a line extending in the second direction.

8. The glass stack structure of claim 7, wherein
the carrier plate and the mother glasses includes first marginal areas separated from the cell area in the first direction by the wave lines and second marginal areas separated from the cell area in the second direction by the linear lines, and
the edge line is arranged on one of the first marginal areas close to one of the wave lines.

9. The glass stack structure of claim 1, wherein each of the mother glasses includes a flexible glass having a thickness in a range of about 1/200 to about 1/50 times the first thickness.

10. The glass stack structure of claim 9, wherein the thickness of the flexible glass is in a range of about 20 μm to about 300 μm.

11. The glass stack structure of claim 1, further comprising:
a protection plate adhered to an uppermost mother plate of the stack glass by the adhesive line and the adhesive layer, which are arranged on the uppermost mother glass,
wherein the stack glass is covered by the protection plate.

12. A method of manufacturing a glass stack structure, the method comprising:
loading a carrier plate onto a support, wherein the carrier plate has a length longer than a width thereof;
providing a pair of high viscous linear dams on the carrier plate along a latitudinal direction to be spaced apart from each other in a longitudinal direction, wherein a preliminary cell area is defined on the carrier plate by the pair of the high viscous linear dams, and second marginal areas are defined on the carrier plate between edge portions of the carrier plate and the pair of the high viscous linear dams;
providing a pair of high viscous dot-line dams on the carrier plate along the longitudinal direction to be spaced apart from each other in the latitudinal direction, wherein the pair of the high viscous dot-line dams includes a plurality of dot dams and a plurality of flow spaces defined between neighboring dot dams, the preliminary cell area defined by the pair of the high viscous dot-line dams is provided as a cell area, and peripheral areas between edge portions of the carrier plate and the pair of the high viscous dot-line dams are provided as first marginal areas;
supplying a low viscous adhesive onto the cell area of the carrier plate in a way such that the cell area is irregularly covered by the low viscous adhesive;
positioning a mother glass on the pair of the high viscous dot-line dams and the pair of the high viscous linear dams; and
conducting a laminating process for the mother glass in a way such that the mother glass is compressed to the carrier plate sequentially from a left side to a right side in the latitudinal direction until the low viscous adhesive uniformly spreads in the cell area to adhere the mother glass to the carrier plate, wherein bubbles are removed in the low viscous adhesive through the flow spaces.

13. The method of claim 12, wherein the pair of the high viscous dot-line dams are provided by a periodic injection of a high viscous adhesive material onto the carrier plate from an injector which moves over the carrier plate in the longitudinal direction.

14. The method of claim 13, wherein
each of the dot dams has a dam length in the longitudinal direction,
the neighboring dot dams are spaced apart from each other by a gap distance in the longitudinal direction, and
the dam length is in a range of about 0.3 times to about 1.0 times the gap distance between the neighboring dot dams.

15. The method of claim 13, wherein
each of the dot dams has a shape of one of a circle and an ellipse, and
the dam length of each of the dot dams is 1 times to 5 times a dam width thereof in the latitudinal direction.

16. The method of claim 12, wherein the conducting the laminating process includes:
combining a cover glass to the mother glass in a way such that an upper surface of the mother glass is covered with the cover glass;
compressing a roller to the cover glass in a way such that the cover glass is compressed toward the carrier plate by a compression force; and
moving the roller from the left side to the second side in the latitudinal direction in a way such that the pair of the high viscous linear dams, the pair of the high viscous dot-line dams and the lower viscous adhesive are formed into a pair of linear lines extending in the latitudinal direction, a pair of wave lines extending in the longitudinal direction and an adhesive layer uniformly covering the whole cell area, respectively,
wherein the mother glass is adhered to the carrier plate by the pair of the linear lines, the pair of the wave lines and the adhesive layer.

17. The method of claim 16, wherein the dot-line dams are compressed by the compression force and the dot dams are extracted in the neighboring flow spaces in the laminating process in a way such that the dot dams are formed into a plurality of body portions and extraction residuals of the dot dams are formed into a plurality of extended portions in every flow spaces, to form the wave lines from the dot-line dams in the laminating process.

18. The method of claim 17, wherein the low viscous adhesive is confined in the cell area by the linear lines in the second direction and is partially overflow to the first marginal area together with the bubbles through the flow spaces of the dot-line dams, and wherein an edge adhesive having a line shape extending in the second direction and arranged on the first marginal area close to the wave line is formed by the partially overflowed low viscous adhesive.

19. The method of claim 18, wherein
the edge line includes a plurality of concave portions arranged around the plurality of body portions, and a plurality of convex portions arranged around the plurality of body portions, and
the concave portions and the convex portions are alternately arranged in a line along the second direction.

20. The method of claim 12, further comprising:
after the conducting the laminating process, conducting a hardening process to the wave lines, the linear lines and the adhesive layer between the carrier plate and the mother glass.

* * * * *